United States Patent [19]

Nukada et al.

[11] Patent Number: 5,283,145
[45] Date of Patent: Feb. 1, 1994

[54] CRYSTALS OF DICHLOROTIN PHTHALOCYANINE, METHOD OF PREPARING THE CRYSTAL, AND ELECTROPHOTOGRAPHIC PHOTORECEPTOR COMPRISING THE CRYSTAL

[75] Inventors: Katsumi Nukada; Akira Imai; Yasuo Sakaguchi; Katsumi Daimon; Masakazu Iijima; Toru Ishii; Kiyokazu Mashimo, all of Minami Ashigara, Japan

[73] Assignee: Fuji Xerox Co., Ltd., Tokyo, Japan

[21] Appl. No.: 874,093

[22] Filed: Apr. 27, 1992

[30] Foreign Application Priority Data

May 1, 1991 [JP] Japan .................... 3-126489
Nov. 15, 1991 [JP] Japan .................... 3-326721

[51] Int. Cl.$^5$ ........................... G03G 15/00
[52] U.S. Cl. ........................... 430/78; 430/56; 540/140; 540/141
[58] Field of Search ............ 430/56, 78; 540/140, 540/141

[56] References Cited

U.S. PATENT DOCUMENTS

| | | |
|---|---|---|
| 2,197,459 | 4/1940 | Wyler . |
| 2,770,029 | 11/1956 | Ueltz . |
| 3,160,635 | 12/1964 | Knudsen et al. . |
| 3,357,989 | 12/1967 | Byrne et al. . |
| 3,708,292 | 1/1973 | Brach et al. . |

FOREIGN PATENT DOCUMENTS

| | | |
|---|---|---|
| 4834189 | 5/1973 | Japan . |
| 49105536 | 10/1974 | Japan . |
| 5038543 | 4/1975 | Japan . |
| 57148745 | 9/1982 | Japan . |
| 5821414 | 2/1983 | Japan . |
| 1-144057 | 6/1989 | Japan . |

OTHER PUBLICATIONS

Zeitschrift fur anorganische und allgemeine Chemie, 354, No. 1-2, (Sep. 1967): 1-9.

Primary Examiner—John Kight
Assistant Examiner—T. Mosley
Attorney, Agent, or Firm—Oliff & Berridge

[57] ABSTRACT

Dichlorotin phthalocyanine crystals having distinct diffraction peaks at (i) 8.7°, 9.9°, 10.9°, 13.1°, 15.2°, 16.3°, 17.4°, 21.9° and 25.5°, or (ii) 9.2°, 12.2°, 13.4°, 14.6°, 17.0° and 25.3° of the Bragg angle (2θ±0.2) to a CuKα characteristic X-ray; a method of preparing dichlorotin phthalocyanine crystals having the strongest diffraction peak at 28.2° in the range of from 25° to 30° of the Bragg angle (2θ±0.2) in an X-ray diffraction spectrum; and an electrophotographic photoreceptor comprising an electroconductive support having thereon a light-sensitive layer containing the dichlorotin phthalocyanine crystals having distinct diffraction peaks at the particular angles or the dichlorotin phthalocyanine crystals prepared by the method.

17 Claims, 17 Drawing Sheets

CRYSTALS OF DICHLOROTIN PHTHALOCYANINE, METHOD OF PREPARING THE CRYSTAL, AND ELECTROPHOTOGRAPHIC PHOTORECEPTOR COMPRISING THE CRYSTAL

FIELD OF THE INVENTION

The present invention relates to dichlorotin phthalocyanine crystals useful as a photoconductive material, a method of preparing the crystals, and an electrophotographic photoreceptor comprising the crystals.

BACKGROUND OF THE INVENTION

Phthalocyanines are useful as materials for paint compositions, printing inks and catalysts and as electronic materials and, in particular, they have been broadly investigated as materials for electrophotographic photoreceptors, materials for optical recording and materials for photo-electric conversion in these days.

Regarding electrophotographic photoreceptors, recently, the demand for extending the light-sensitive wavelength range of organic photoconductive materials which have heretofore been proposed up to the near infrared wavelength range of semiconductor lasers (780 to 830 nm) so as to use the materials as a photoreceptor for a digital recording system such as a laser printer. From the viewpoint, squalilium compounds (as disclosed, e.g., in JP-A-49-105536 and JP-A-58-21414 triphenylamine trisazo compounds (as disclosed, e.g., in JP-A-61-151659) and phthalocyanine compounds (as disclosed, e.g., in JP-A-48-34189 and JP-A-57-148745) have been proposed as photoconductive materials for semiconductor lasers. (the term "JP-A" as used herein means an "unexamined published Japanese patent application")

Where organic photoconductive materials are used as light-sensitive materials for semiconductor lasers, they are needed to satisfy the conditions that the light-sensitive wavelength range is extended up to a long wavelength range and that the sensitivity and durability of the photoreceptors to be formed therefrom are good. The above-mentioned organic photoconductive materials do not sufficiently meet the conditions.

In order to overcome various drawbacks of the known photoconductive materials, the materials have been investigated with respect to the relationship between the crystal form and the electrophotographic characteristics. In particular, many reports relating to phthalocyanine compounds have heretofore been disclosed.

In general, it is known that phthalocyanine compounds have various crystal forms, depending upon the difference in the manufacture method and treating method, and that the difference in the crystal form has a great influence on the photo-electric, conversion characteristics of phthalocyanine compounds. Regarding crystal forms of phthalocyanine compounds, for example, with respect to copper phthalocyanine, various crystal forms of $\alpha$, $\pi$, $\chi$, $\rho$, $\gamma$ and $\delta$ are known in addition to a stable crystal form of $\beta$. It is also known that these crystal forms are mutually transferable to each other by mechanical tension, sulfuric acid treatment, organic solvent treatment or heat treatment (for example, refer to U.S. Pat. Nos. 2,770,029, 3,160,635, 3,708,292 and 3,357,989). JP-A-50-38543 describes relationship between the difference of crystal forms of copper phthalocyanine and electrophotographic characteristics of them.

JP-A-62-119547 describes an electrophotographic photoreceptor having a dihalogenotin phthalocyanine as a charge generating material; and JP-A-1-144057 describes tin phthalocyanine compounds having particular diffraction peaks on an X-ray diffraction pattern and an electrophotographic photoreceptor having them.

However, the above-mentioned phthalocyanine compounds which have heretofore been proposed are not sufficient in point of the light sensitivity and the durability when used as a light-sensitive material.

The present invention has been made in view of the above-mentioned situation of the prior art techniques.

SUMMARY OF THE INVENTION

One object of the present invention is to provide crystals of dichlorotin phthalocyanine which are useful as a photoconductive material sensitive to light of a long wavelength range.

Another object of the present invention is to provide an electrophotographic photoreceptor having high sensitivity and durability, which contains the above crystals of dichlorotin phthalocyanine as a photoconductive material therein.

Still another object of the present invention is to provide a method of preparing crystals of dichlorotin phthalocyanine which are useful as a photoconductive material sensitive to light of a long wavelength range.

Still another object of the present invention is to provide an electrophotographic photoreceptor having high sensitivity and durability, which contains crystals of dichlorotin phthalocyanine as produced by the method of the present invention as a photoconductive material therein.

As a result of investigation, the present inventors have found that novel crystals of dichlorotin phthalocyanine having high sensitivity and durability as a photoconductive material can be obtained by subjecting dichlorotin phthalocyanine crystals as obtained by synthesis to particular treatment. As a result of investigation of the crystal system of dichlorotin phthalocyanine, the inventors have further found that dichlorotin phthalocyanine includes four crystal forms of I to IV types, that these crystal forms are obtained by grinding dichlorotin phthalocyanine as obtained by synthesis or by milling them along with an organic solvent, and that crystals of III type and IV type are relatively unstable in comparison to those of I type and II type and are easily transferred to crystals of I type crystal form by treatment with a pertinent organic solvent.

Furthermore, the inventors also have found that crystals of I type as obtained by crystal transfer from crystals of III type and IV type have a quite different peak intensity ratio from those as obtained not via crystals of III type and IV type, although the positions of the peaks in the powder X-ray diffraction are almost the same in them, and that the crystals of I type obtained via III type and IV type crystal forms have better electrophotographic characteristics than the crystals of I type obtained not obtained via III type and IV type crystal forms.

The present invention has been made on the basis of the above-mentioned findings.

The present invention relates to dichlorotin phthalocyanine crystals of III type crystal form, which have distinct diffraction peaks at of 8.7°, 9.9°, 10.9°, 13.1°, 15.2°, 16.3°, 17.4°, 21.9° and 25.5° of the Bragg angle (2θ±0.2) to a CuKα characteristic X-ray.

The present invention also relates to dichlorotin phthalocyanine crystals of IV type crystal form, which have distinct diffraction peaks at 9.2°, 12.2°, 13.4°, 14.6°, 17.0° and 25.3° of the Bragg angle (2θ±0.2) to a CuKα characteristic X-ray.

The present invention further relates to an electrophotographic photoreceptor comprising an electroconductive support having thereon a light-sensitive layer containing the above-mentioned dichlorotin phthalocyanine crystals of III type or IV type crystal form.

The present invention further relates to a method of preparing dichlorotin phthalocyanine crystals of I type crystal form having the strongest diffraction peak at 28.2° in the range of from 25° to 30° of the Bragg angle (2θ±0.2) to a CuKα X-ray radiation of λ=1.5418 A.U. (hereinafter referred to as "Bragg angle"). The method comprises treating (a) dichlorotin phthalocyanine crystals of III type crystal form which have distinct diffraction peaks at 8.7°, 9.9°, 10.9°, 13.1°, 15.2°, 16.3°, 17.4°, 21.9° and 25.5° of the Bragg angle (2θ±0.2), or (b) dichlorotin phthalocyanine crystals of IV type crystal form which have distinct diffraction peaks at 9.2°, 12.2°, 13.4°, 14.6°, 17.0° and 25.3° of the Bragg angle (2θ±0.2) in an organic solvent so as to transfer the crystals into dichlorotin phthalocyanine crystals of I type crystal form and having the strongest diffraction peak at 28.2° in the range of from 25° to 30° of the Bragg angle (2θ±0.2).

The present invention still further relates to an electrophotographic photoreceptor comprising an electroconductive support having thereon a light-sensitive layer containing dichlorotin phthalocyanine crystals, which crystals have the strongest diffraction peak at 28.2° in the range of from 25° to 30° of the Bragg angle (2θ±0.2) and are prepared by the above-mentioned method of the present invention.

DETAILED DESCRIPTION OF THE INVENTION

Figure 1:
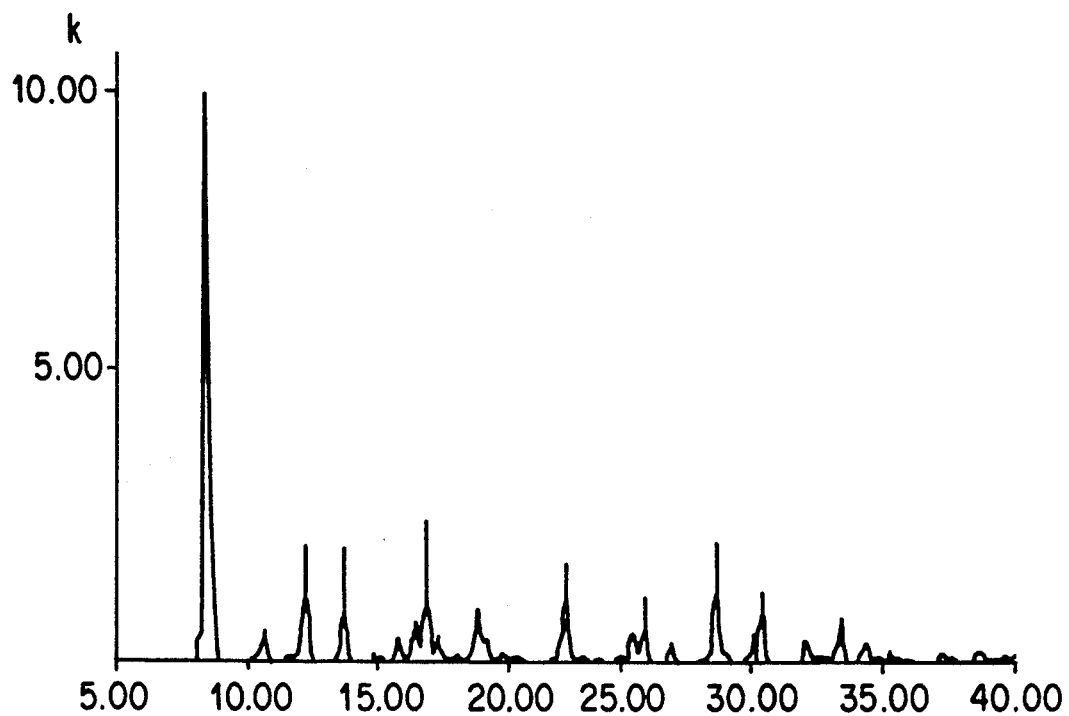
FIG. 1 shows the powder X-ray diffraction pattern of the dichlorotin phthalocyanine crystals obtained in Synthesis Example 1.

Dichlorotin phthalocyanine used in the present invention is represented by formula (I):

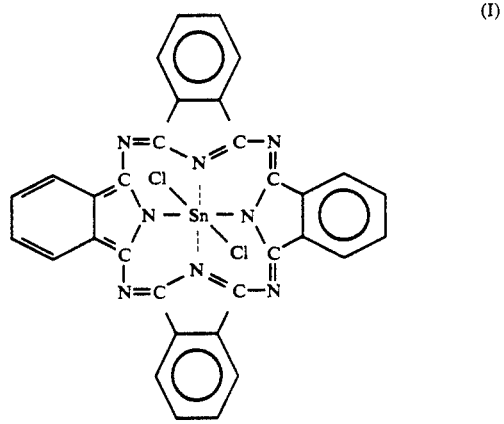

III type dichlorotin phthalocyanine crystals and IV type dichlorotin phthalocyanine crystals of the present invention are novel and can be produced in the manner mentioned below.

Specifically, dichlorotin phthalocyanine crystals synthesized by known methods (as described, e.g., in U.S. Pat. No. 2,197,459) are ground in a ball mill along with a particular organic solvent to obtain the III type or IV type crystals of the present invention. Alternatively, the III type or IV type crystals may also be obtained by first dry-grinding dichlorotin phthalocyanine crystals synthesized by known methods and thereafter treating them with a particular organic solvent.

Examples of the organic solvents used for preparing III type dichlorotin phthalocyanine include aromatic hydrocarbons such as toluene, xylene or chlorobenzene, and chlorobenzene is the most preferred.

Examples of the organic solvents used for preparing IV type dichlorotin phthalocyanine include ethers such as tetrahydrofuran or 1,4-dioxane, and tetrahydrofuran is preferably used.

For grinding dichlorotin phthalocyanine crystals to prepare III type or IV type dichlorotin phthalocyanine of the present invention, a ball mill, a sand mill, a kneader and the like may be used, which, however, are not limitative. If desired, grinding media such as glass beads or steel beads, as well as grinding aids such as sodium chloride or Glauber's salt can be used. Grinding is preferably effected at a temperature ranging from 10° to 50° C., generally at room temperature, for a period of from 10 to 100 hours.

As mentioned above, III type dichlorotin phthalocyanine crystals having distinct diffraction peaks at 8.7°, 9.9°, 10.9°, 13.1°, 15.2°, 16.3°, 17.4°, 21.9° and 25.5° of the Bragg angle ($2\theta \pm 0.2$), and IV type dichlorotin phthalocyanine crystals having distinct diffraction peaks at 9.2°, 12.2°, 13.4°, 14.6°, 17.0° and 25.3° of the Bragg angle ($2\theta \pm 0.2$) can be prepared.

In accordance with the method of preparing dichlorotin phthalocyanine crystals of the present invention, the III type or IV type dichlorotin phthalocyanine crystals of the present invention are treated in an organic solvent so as to transfer them into I type dichlorotin phthalocyanine crystals having the strongest diffraction peak at 28.2° C. in the range of from 25° to 30° of the Bragg angle ($2\theta \pm 0.2$).

Examples of the solvents used in the treatment include ketones such as acetone and methyl ethyl ketone (MEK); halogenated hydrocarbons such as methylene chloride and chloroform; acetates such as ethyl acetate and butyl acetate; and dimethylformamide (DMF). In the method of the present invention, a suitable solvent can be appropriately selected in order to obtain dichlorotin phthalocyanine crystals of I type crystal form having the strongest diffraction peak at 28.2° in the range of from 25° to 30° of the Bragg angle ($2\theta \pm 0.2$). Among these solvents, acetates are preferably used.

The present invention also provides an electrophotographic photoreceptor, which has the above-mentioned III type or IV type dichlorotin phthalocyanine crystals of the present invention or the above-mentioned I type dichlorotin phthalocyanine crystals obtained by the method of the present invention as the photoconductive material in the light-sensitive layer. The electrophotographic photoreceptor will be explained in detail hereunder.

In the electrophotographic photoreceptor of the present invention, the light-sensitive layer may be a single layer or may also have a laminated structure composed of a charge generating layer and a charge transporting layer each having a different function.

In the case where the light-sensitive layer has a laminated structure, the charge generating layer may be composed of the above-mentioned dichlorotin phthalocyanine crystals and a binder resin.

The binder resin may be selected from insulating resins of a broad range or may also be selected from organic photoconductive polymers such as poly-N-vinyl carbazole, polyvinyl anthracene and polyvinyl pyrene. Preferred as a binder resin include insulating resins such as polyvinyl butyral, polyarylates (e.g., polycondensate of bisphenol A and phthalic acid), polycarbonates, polyesters, phenoxy resins, vinyl chloride-vinyl acetate copolymers, polyvinyl acetate, acrylic resins, polyacrylamides, polyamides, polyvinyl pyridine, cellulose resins, urethane resins, epoxy resins, casein, polyvinyl alcohol and polyvinyl pyrrolidone.

The charge generating layer may be formed by dispersing the above-mentioned dichlorotin phthalocyanine crystals in a solution containing the above-mentioned binder resin as dissolved in an organic solvent to prepare a coating composition followed by coating the composition on an electroconductive support. The proportion of the dichlorotin phthalocyanine crystals to the binder resin may generally be from 40/1 to 1/10, preferably from 10/1 to ¼, by weight. If the proportion of the dichlorotin phthalocyanine crystals is too high, the stability of the coating composition tends to lower. If it is too low, the sensitivity of the light-sensitive layer tends to lower. Therefore, the proportion is preferred to be within the above range.

Where the I type dichlorotin phthalocyanine crystals prepared by the method of the present invention are used as the photoconductive material in the photoreceptor of the present invention, it is also possible that a coating composition containing III type or IV type dichlorotin phthalocyanine crystals is first prepared and the III or IV type crystals in the composition are transferred into the I type crystals.

The solvent to be used is preferably selected from those which do not dissolve the adjacent subbing layer, which will be described below, and the adjacent charge transporting layer. Examples of the organic solvents include alcohols such as methanol, ethanol and isopropanol; ketones such as acetone, methyl ethyl ketone and cyclohexanone; amides such as N,N-dimethylformamide and N,N-dimethylacetamide; dimethylsulfoxides; ethers such as tetrahydrofuran, dioxane and ethylene glycol monomethyl ether; esters such as methyl acetate and ethyl acetate; halogenated aliphatic hydrocarbons such as chloroform, methylene chloride, dichloroethylene, carbon tetrachloride and trichloroethylene; and aromatic hydrocarbons such as benzene, toluene and dichlorobenzene.

Where the I type dichlorotin phthalocyanine crystals prepared by the method of the present invention are used, acetates are preferred as the solvent.

Coating of the coating composition may be effected by any ordinary coating method, such as dip-coating method, spray-coating method, spinner coating method, bead coating method, wire bar coating method, blade coating method, roller coating method or curtain coating method. Drying of the coated layer is preferably effected by drying to touch at room temperature followed by hot drying under heat. The hot drying may be effected at a temperature of form 30° to 200° C. for a period of time of from 5 minutes to 2 hours under static condition or with blowing.

The thickness of the charge generating layer may be, in general, approximately from 0.05 to 5 μm.

The charge transporting layer is composed of a charge transporting material and a binder resin.

As the charge transporting material, any conventional compounds can be used. Examples thereof include polycyclic aromatic compounds such as anthracene, pyrene and phenanthrene compounds; nitrogen-containing heterocyclic compounds such as indole, carbazole and imidazole compounds; as well as pyrazoline compounds, hydrazone compounds, triphenylmethane compounds, triphenylamine compounds, enamine compounds, and stilbene compounds.

In addition, photoconductive polymers such as poly-N-vinyl carbazole, halogenated poly-N-vinyl carbazoles, polyvinyl anthracene, poly-N-vinylphenyl anthracene, polyvinyl pyrene, polyvinyl acridine, polyvinyl acenaphthylene, polyglycidyl dicarbazole, pyreneformaldehyde resins, and ethylcarbazoleformaldehyde resins can also be used. These polymers may form the layer by themselves.

As the binder resin, the insulating resins as mentioned for the above charge generating layer may be used.

The charge transporting layer may be formed by preparing a coating composition by using the charge transporting material, the binder resin and an organic solvent, followed by coating the composition in the same manner as in the preparation of the charged generating layer. Examples of the organic solvent include those mentioned for the preparation of the charge generating layer. The proportion of the charge transporting material to the binder resin is generally within the range of from 5/1 to 1/5 by weight. The thickness of the charge transporting layer is generally within the range of approximately from 10 to 30 μm.

Where the electrophotographic photoreceptor of the present invention has a light-sensitive layer having a single layer constitution, the light-sensitive layer may be a photoconductive layer comprising the above-mentioned dichlorotin phthalocyanine crystals dispersed in a layer composed of a charge transporting material and a binder resin. The proportion of the charge transporting material to the binder resin is preferably within the range of approximately from 1/20 to 5/1 by weight; and the proportion of the dichlorotin phthalocyanine crystals to the charge transporting material is preferably within the range of approximately from 1/10 to 10/1 by weight. As the charge transporting material and the binder resin, those as mentioned above can be used; and the photoconductive layer may be formed in the manner as mentioned above.

As the electroconductive support, any conventional materials used in ordinary electrophotographic photoreceptors can be used.

In the present invention, the electroconductive support may be coated with a subbing layer. Such a subbing layer is effective for inhibiting injection of any unnecessary charges from the electroconductive support and has a function of elevating the charging property of the light-sensitive layer. In addition, it also has another function of elevating the adhesiveness between the light-sensitive layer and the electroconductive support. Examples of the material constituting the subbing layer include polyvinyl alcohol, polyvinyl pyrrolidone, polyvinyl pyridine, cellulose ethers, cellulose esters, polyamides, polyurethane, casein, gelatin, polyglutamic acid, starch, starch acetate, aminostarches, polyacrylic acids, polyacrylamide, zirconium chelate compounds, zirconium alkoxide compounds, organic zirconium compounds, titanyl chelate compounds, titanyl alkoxide compounds, organic titanyl compounds and silane coupling agents. The thickness of the subbing layer is preferably within the range of approximately from 0.05 to 2 μm.

The present invention will be explained in more detail by way of the following examples, which, however, are not intended to restrict the scope of the present invention.

SYNTHESIS EXAMPLE 1

Synthesis of Dichlorotin Phthalocyanine 50 g of phthalonitrile and 27 g of anhydrous stannic chloride were added to 350 ml of 1-chloronaphthalene and reacted at 195° C. for 5 hours. The product was taken out by filtration, washed with 1-chloronaphthalene, acetone, methanol and water in this order and dried under reduced pressure to obtain 18.3 g (yield: 27%) of dichlorotin phthalocyanine crystals. FIG. 1 shows the powder X-ray diffraction pattern of the thus obtained dichlorotin phthalocyanine crystals.

EXAMPLE 1

Figure 2:
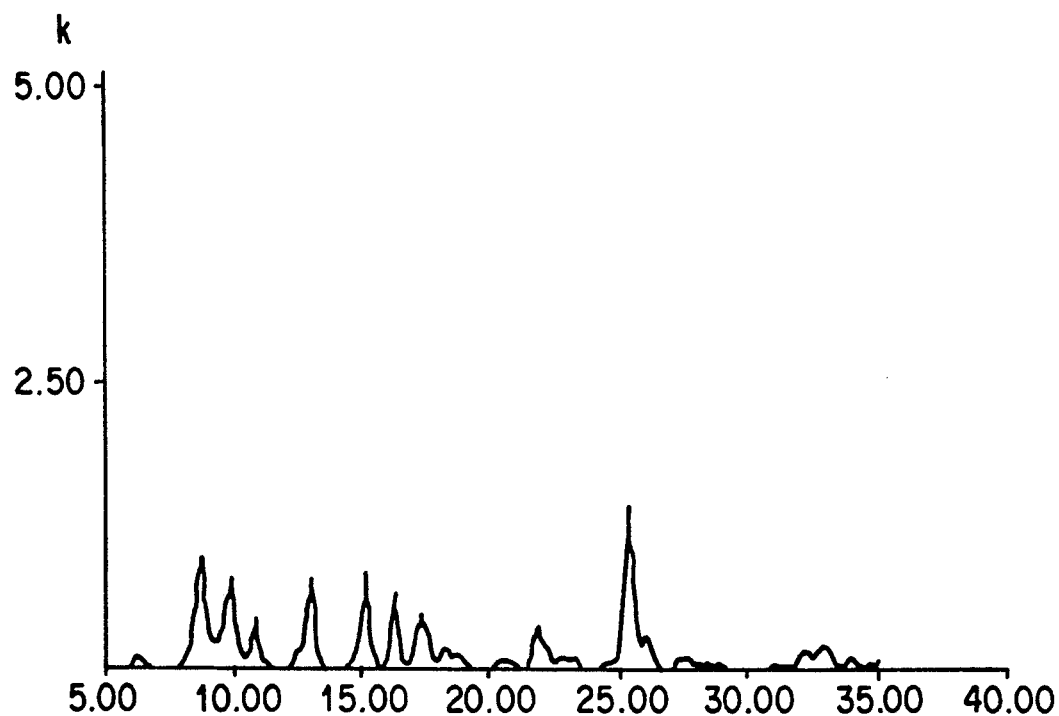
FIG. 2 shows the powder X-ray diffraction pattern of the dichlorotin phthalocyanine crystals obtained in Example 1.

1 g of the dichlorotin phthalocyanine crystals as obtained in Synthesis Example 1 were ground in 30 ml of chlorobenzene along with 100 g of glass beads (diameter: 1 mm), using a ball mill, at room temperature for 72 hours. The resulting slurry was filtered, washed repeatedly with methanol and dried under reduced pressure to obtain 0.97 g of dichlorotin phthalocyanine crystals. FIG. 2 shows the powder X-ray diffraction pattern of the thus obtained dichlorotin phthalocyanine crystals.

Figure 5:
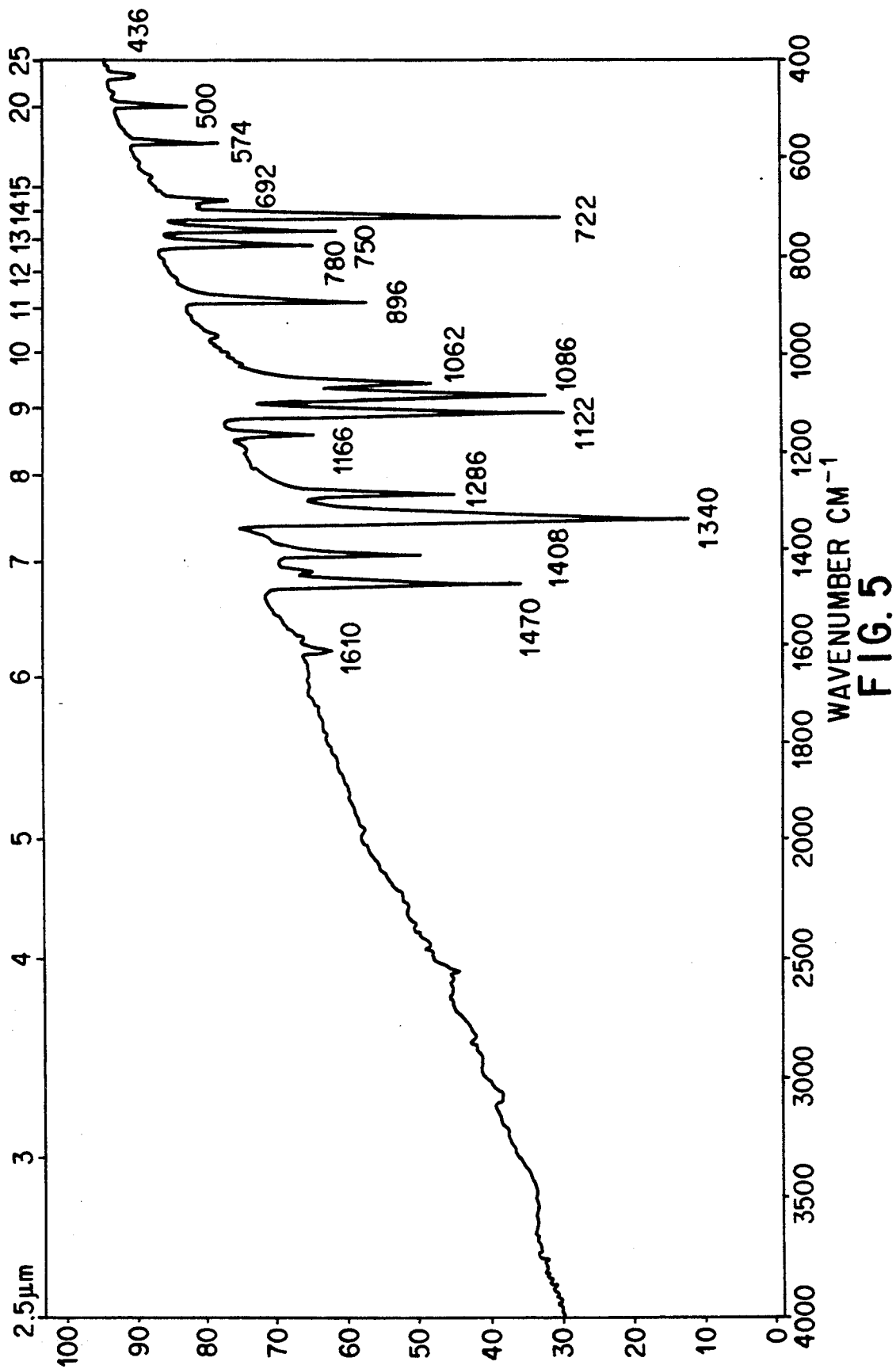
FIG. 5 shows the infrared absorption spectrum of the dichlorotin phthalocyanine crystals obtained in Example 1.
Figure 6:
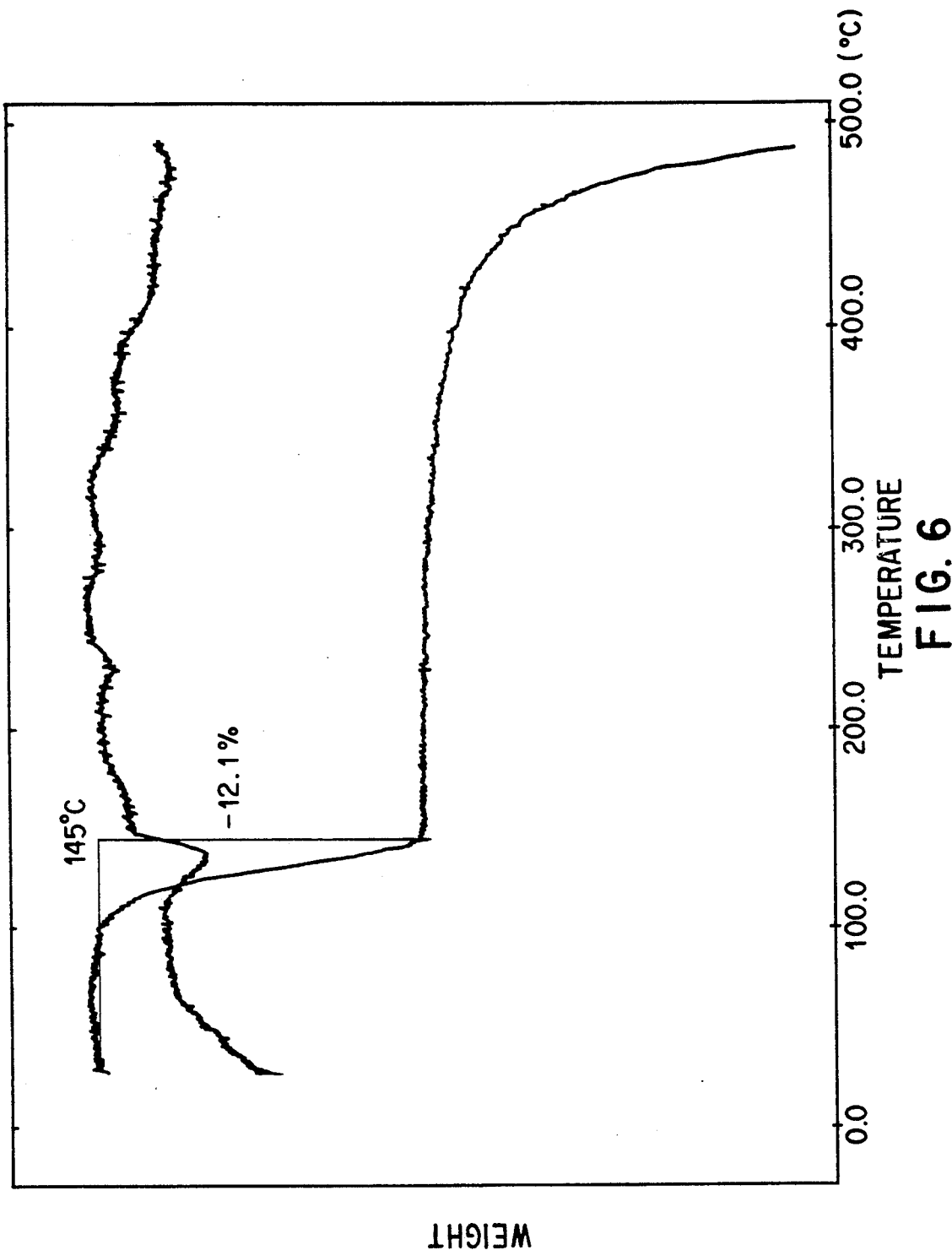
FIG. 6 shows the thermal weight analysis of the dichlorotin phthalocyanine crystals obtained in Example 1.

FIG. 5 shows the infrared absorption spectrum of the crystals obtained. The crystals obtained were allowed to stand in vacuum of 0.1 mmHg at room temperature (20° C.) for 8 hours for drying in vacuum. Then, the vacuum was released and the ambient temperature was gradually elevated from room temperature under normal humidity (20° C., 55% RH) whereupon the thermal weight reduction of the crystals was determined. The results obtained are shown in FIG. 6. From FIG. 6, it is understood that the crystals involved 12.1% weight reduction under heat up to 145° C.

EXAMPLE 2

Figure 3:
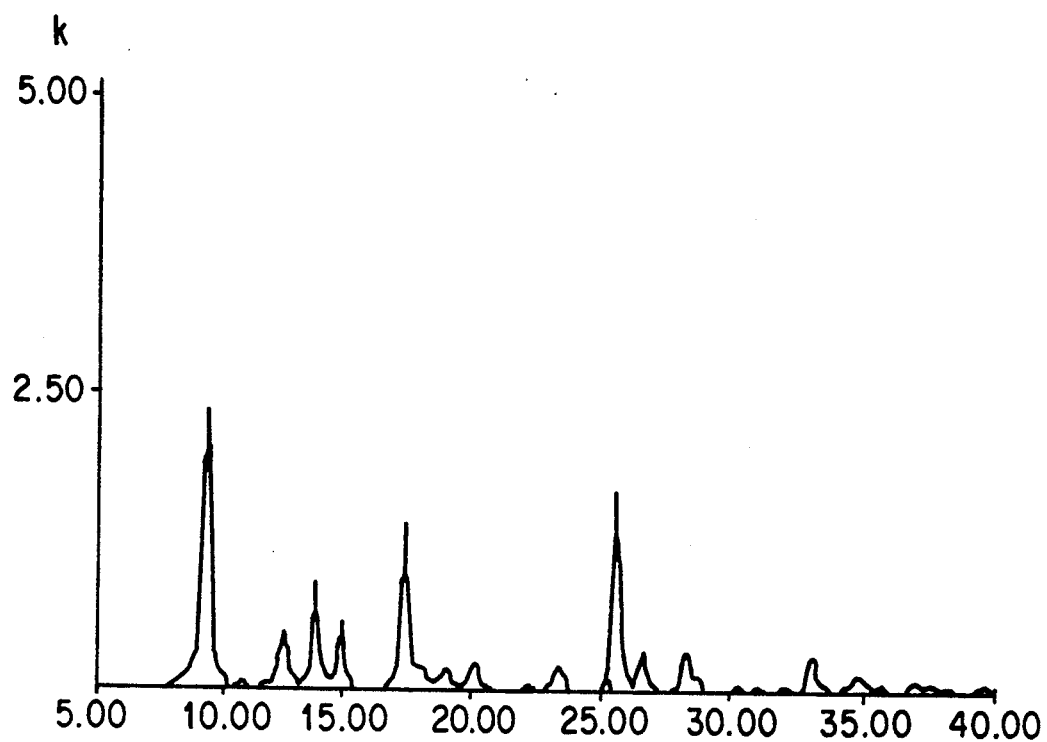
FIG. 3 shows the powder X-ray diffraction pattern of the dichlorotin phthalocyanine crystals obtained in Example 2.

The same process as in Example 1 was repeated except that tetrahydrofuran was used as the solvent for grinding, and 0.93 g of dichlorotin phthalocyanine crystals were obtained. FIG. 3 shows the powder X-ray diffraction pattern of the thus obtained dichlorotin phthalocyanine crystals.

Figure 7:
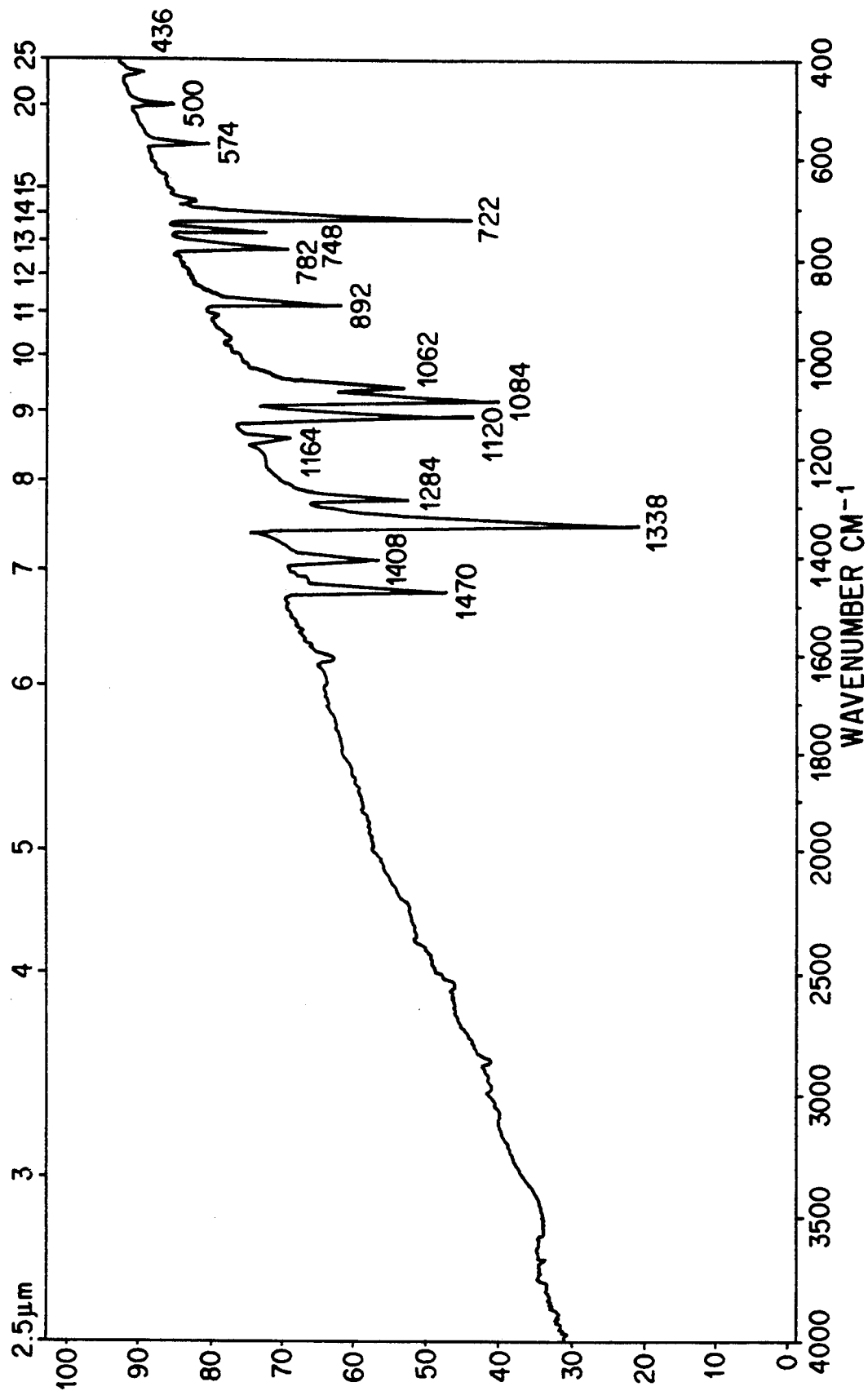
FIG. 7 shows the infrared absorption spectrum of the dichlorotin phthalocyanine crystals obtained in Example 2.
Figure 8:
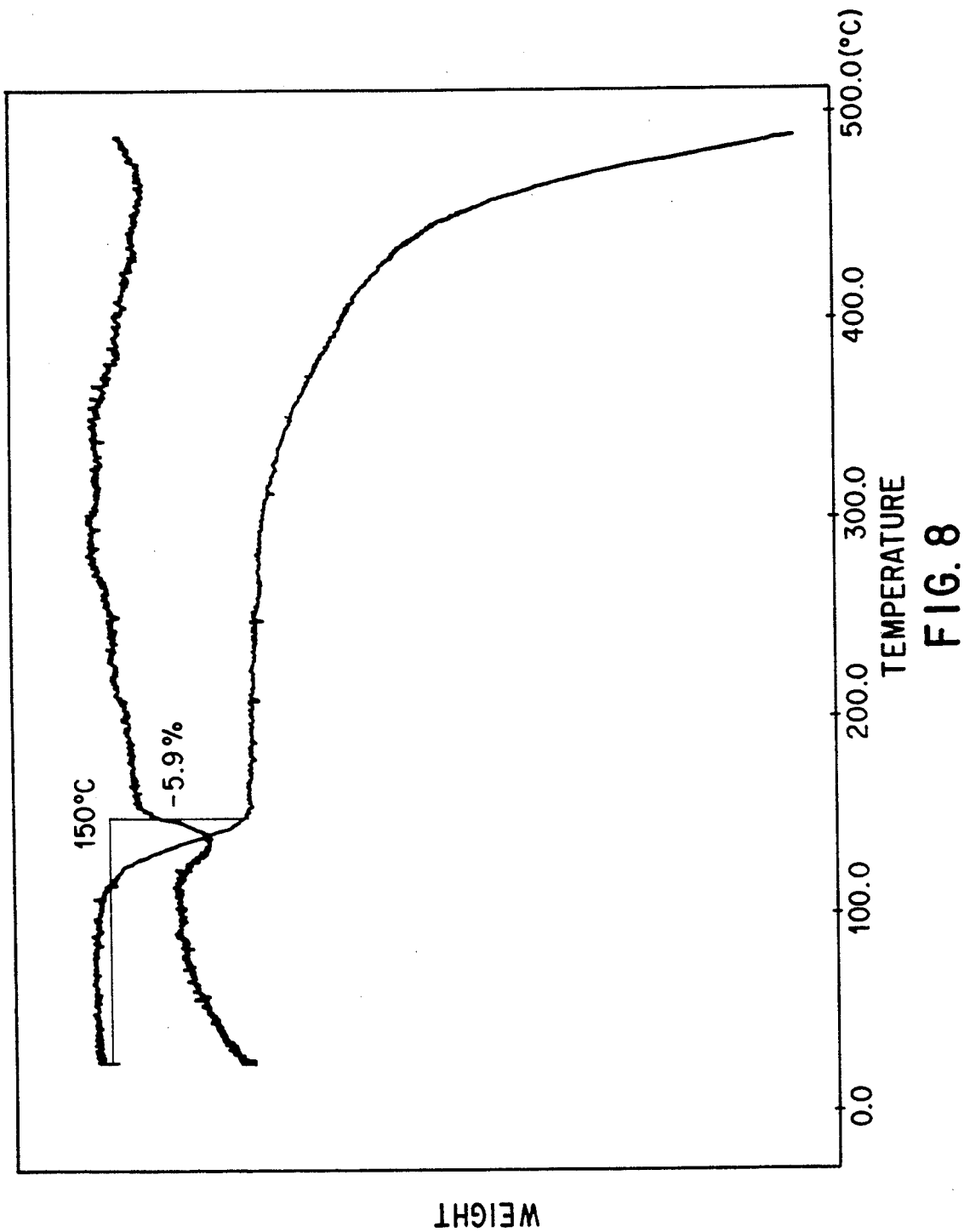
FIG. 8 shows the thermal weight analysis of the dichlorotin phthalocyanine crystals obtained in Example 2.

FIG. 7 shows the infrared absorption spectrum of the crystals obtained. The crystals obtained were allowed to stand in vacuum of 0.1 mmHg at room temperature (20° C.) for 8 hours for drying in vacuum. Then, the vacuum was released and the ambient temperature was gradually elevated from room temperature under normal humidity (20° C., 55% RH) whereupon the thermal weight reduction of the crystals was determined. The results obtained are shown in FIG. 8. From FIG. 8, it is understood that the crystals involved 5.9 % weight reduction under heat up to 150° C.

EXAMPLE 3

One part of the dichlorotin phthalocyanine crystals as obtained in Example 1 were mixed with one part of polyvinyl butyral (S-Lec BM-S, trade name by Sekisui Chemical Co.) and 100 parts of cyclohexanone, and the mixture was dispersed by treating in a paint shaker along with glass beads for one hour. The thus obtained coating composition was coated on an aluminium support by a dip-coating method and dried under heat at 100° C. for 5 minutes to form thereon a charge generating layer having a thickness of 0.2 μm.

Figure 9:
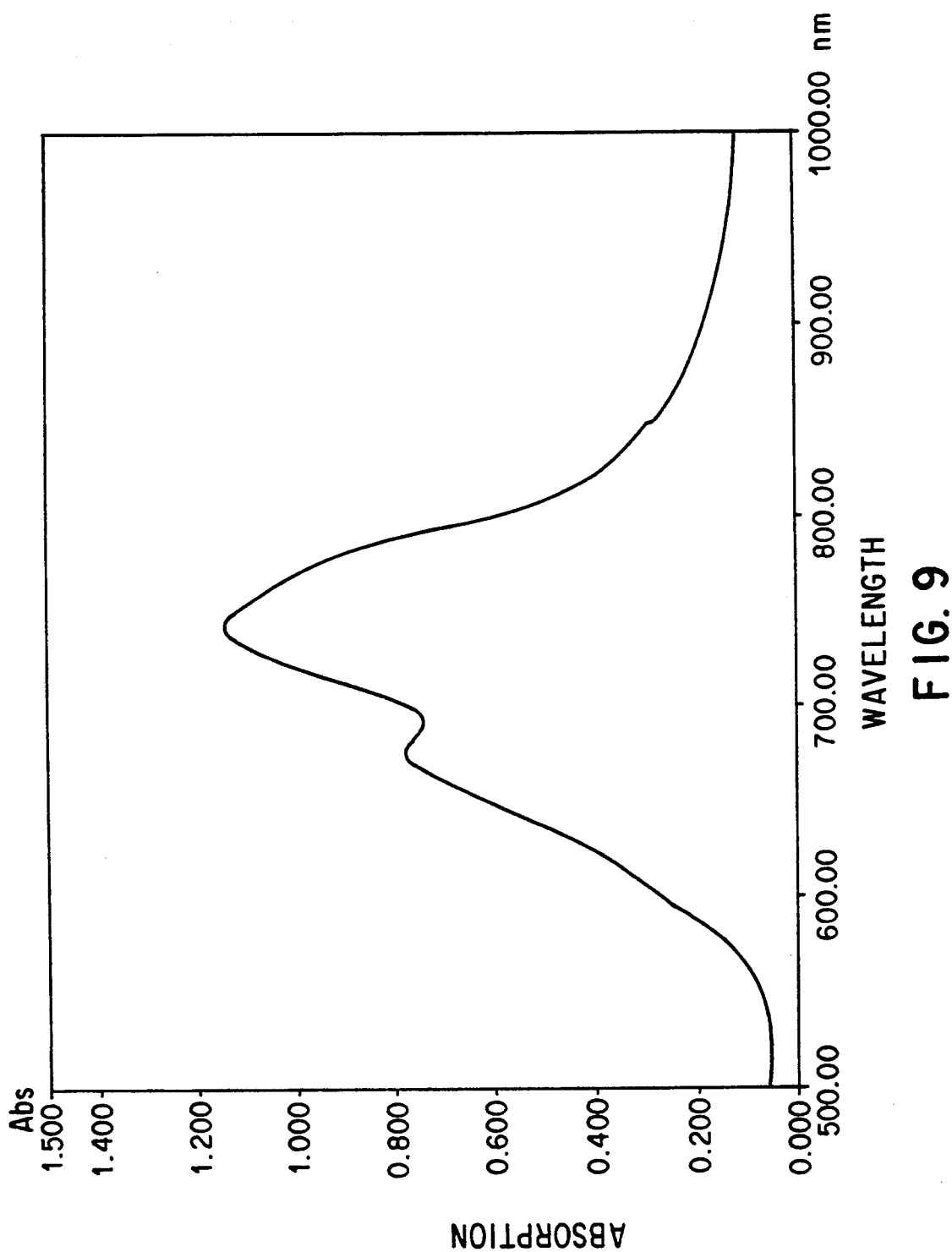
FIG. 9 shows the absorption spectrum of the dried coating composition used in Example 3.

Separately, the coating composition was coated on a glass substrate and the dried to form a coated layer thereon having a thickness of 0.2 μm. The absorption spectrum of the coated layer on the glass substrate was measured. The results obtained are shown in FIG. 9.

2 parts of a compound having the following structural formula:

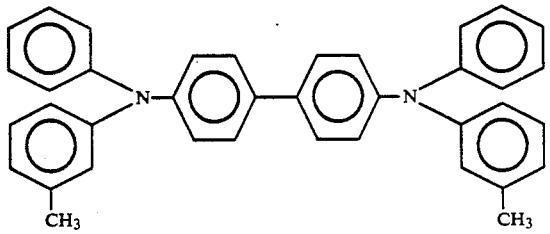

and 3 parts of poly(4,4-cyclohexylidene-diphenylene carbonate) having the following structural formula:

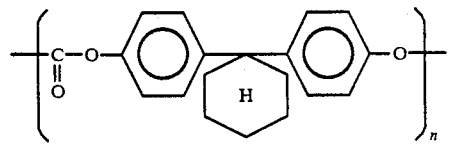

were dissolved in 20 parts of monochlorobenzene, and the resulting coating composition was coated over the charge generating layer as formed on the aluminium support by a dip-coating method, and dried at 120° C. for one hour to form a charge transporting layer thereon having a thickness of 20 μm.

The electrophotographic photoreceptor thus prepared was subjected to corona discharging of −6 KV so as to be charged under a room temperature and normal humidity condition (20° C., 50% RH), using an electrostatic duplicating paper test device (EPA-8100 Model, manufactured by Kawaguchi Denki Co.). Then an 800-nm monochromatic light as derived from a tungsten lamp with a monochrometer was irradiated to the photoreceptor, the irradiated intensity being adjusted to be 1 μW/cm² at the surface of the photoreceptor.

The amount of exposure $E_{\frac{1}{2}}$ (erg/cm²) until the surface potential became a half ($\frac{1}{2}$) of the initial potential $V_0$ (volt) was measured. Next, a tungsten light of 10 luxes was irradiated to the surface of the photoreceptor for one second, and the residual potential $V_R$ was measured. Further, the above charging and exposure cycle was repeated 1,000 times whereupon $V_0$, $E_{\frac{1}{2}}$ and $V_R$ were measured. The results obtained are shown in Table 1 below.

EXAMPLE 4

An electrophotographic photoreceptor was prepared in the same manner as in Example 3, except that dichlorotin phthalocyanine crystals obtained in Example 2 above were used in preparing the charge generating layer. The photoreceptor obtained was evaluated in the same manner as in Example 3. The results obtained are shown in Table 1.

Figure 10:
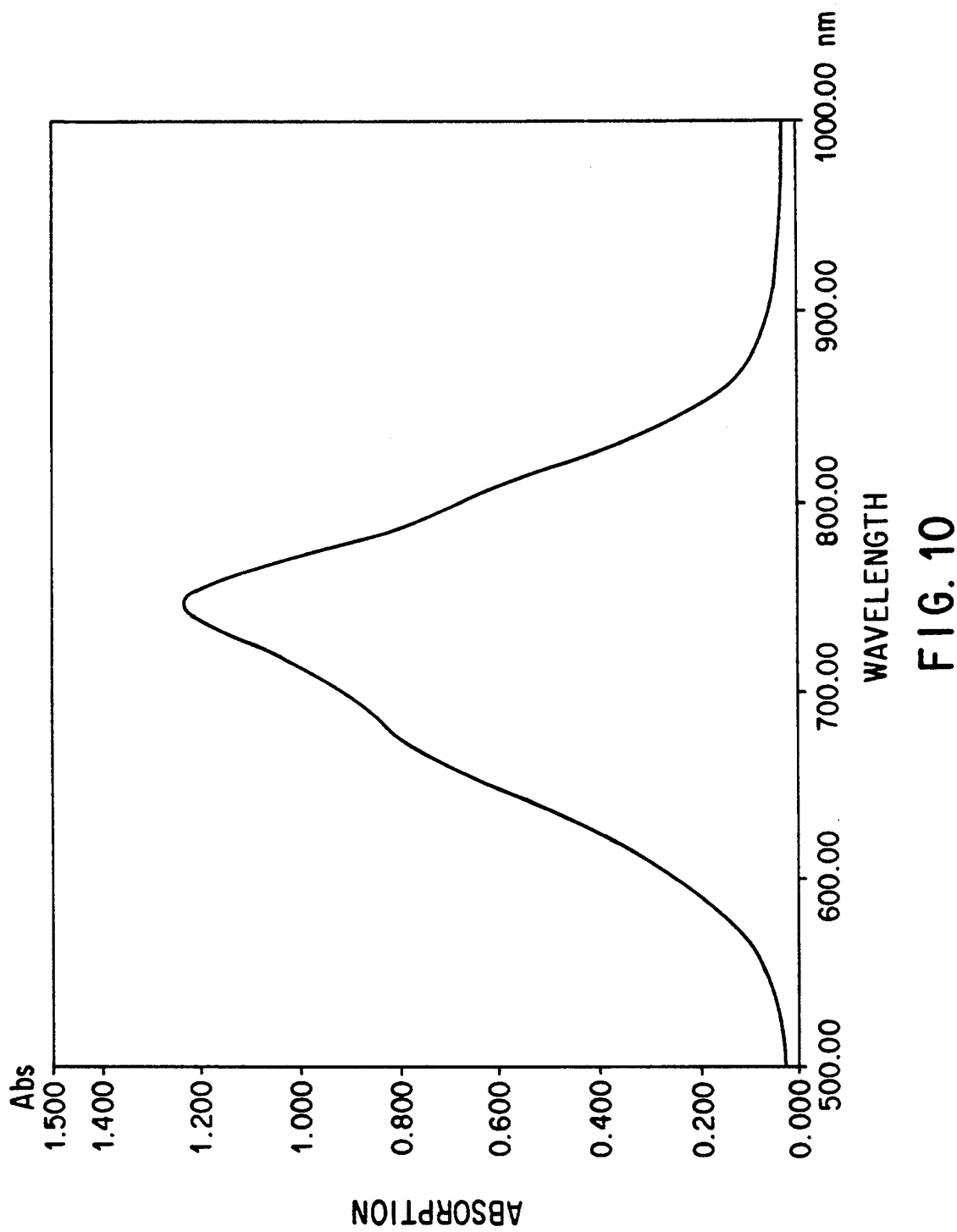
FIG. 10 shows the absorption spectrum of the dried coating composition used in Example 4.

Separately, the coating composition containing the dichlorotin phthalocyanine crystals of in Example 2 was coated on a glass substrate to form a coated layer thereon having a thickness of 0.2 μm. The absorption spectrum of the coated layer on the glass substrate was measured, and the results thereof are shown in FIG. 10.

COMPARATIVE EXAMPLE 1

A comparative electrophotographic photoreceptor was prepared in the same manner as in Example 3, except that the dichlorotin phthalocyanine crystals obtained in Synthesis Example 1 above were directly used in preparing the charge generating layer. The photoreceptor obtained was evaluated in the same manner as in Example 3. The results obtained are shown in Table 1.

COMPARATIVE EXAMPLE 2

Figure 4:
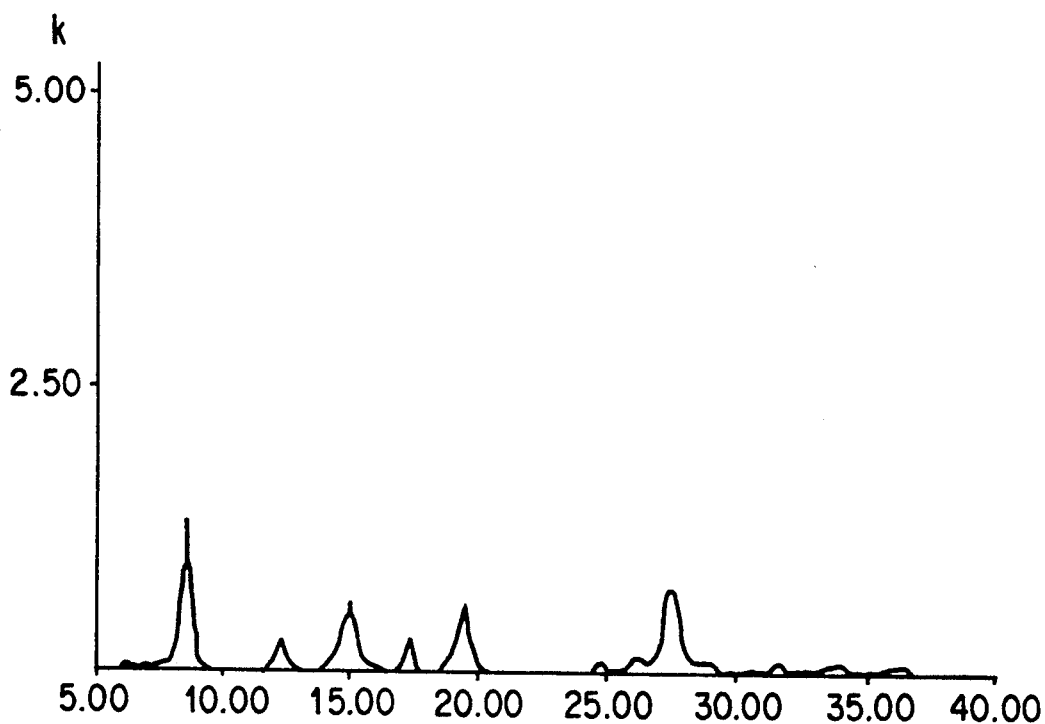
FIG. 4 shows the powder X-ray diffraction pattern of the dichlorotin phthalocyanine crystals obtained in Comparative Example 2.

1 g of the dichlorotin phthalocyanine crystals obtained in Synthesis Example 1 were gradually added to 30 ml of concentrated sulfuric acid with cooling with ice at 0° to 5° C. and dissolved therein. A small amount of impurities therein were removed by filtration, and the resulting solution was dropwise added to 500 ml of ice-water with vigorously stirring, whereupon the product formed was taken out by filtration. This was repeatedly washed with water until the washing waste liquid became neutral. Afterwards, the washed product was dried under reduced pressure to obtain 0.76 g of dichlorotin phthalocyanine crystals. FIG. 4 shows the powdery X-ray diffraction pattern of the thus obtained dichlorotin phthalocyanine crystals.

A comparative electrophotographic photoreceptor was prepared in the same manner as in Example 3, except that the dichlorotin phthalocyanine crystals obtained above were used in preparing the charge generating layer. The photoreceptor obtained was evaluated in the same manner as in Example 3. The results obtained are shown in Table 1.

TABLE 1

| | Characteristics of Photoreceptors | | | | | |
|---|---|---|---|---|---|---|
| | Initial Characteristics | | | Characteristics after 1,000 repetitions of charging-exposure cycle | | |
| Example No. | $V_0$ (V) | $E_{\frac{1}{2}}$ (erg/cm²) | $V_R$ (V) | $V_0$ (V) | $E_{\frac{1}{2}}$ (erg/cm²) | $V_R$ (V) |
| Example 3 | −850 | 2.6 | 3 | −830 | 2.6 | 4 |
| Example 4 | −790 | 3.3 | 5 | −770 | 3.3 | 7 |
| Comparative Example 1 | −870 | 8.5 | 11 | −840 | 8.4 | 14 |
| Comparative Example 2 | −690 | 6.1 | 8 | −535 | 6.9 | 15 |

SYNTHESIS EXAMPLE 2

Figure 11:
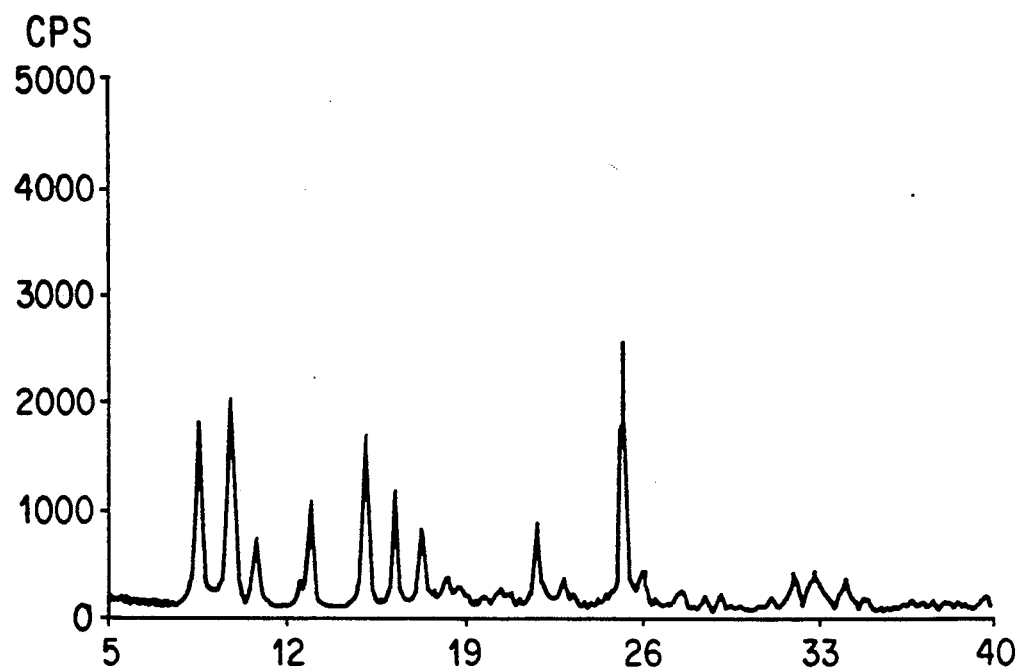
FIG. 11 shows the powder X-ray diffraction pattern of the dichlorotin phthalocyanine crystals obtained in Synthesis Example 2.
Figure 22:
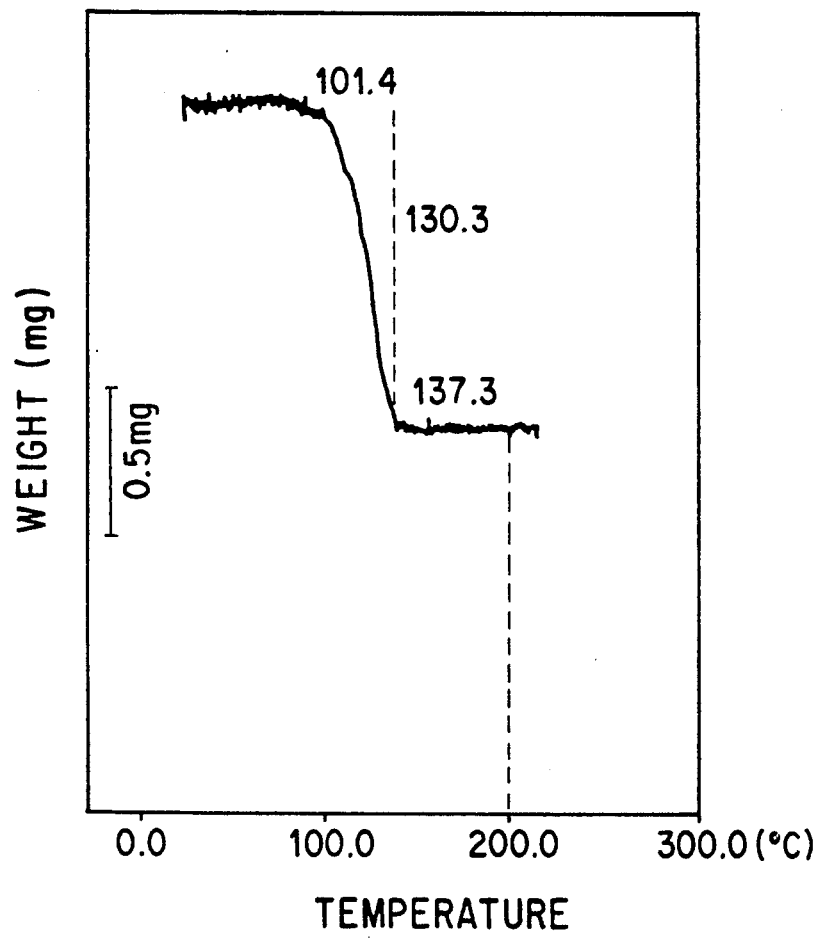
FIG. 22 shows the thermal weight analysis of the dichlorotin phthalocyanine crystals obtained in Synthesis Example 2.

1 g of the dichlorotin phthalocyanine crystals as obtained in Synthesis Example 1 were ground in 30 ml of chlorobenzene (hereinafter referred to as MCB) along with 100 g of glass beads (diameter: 1 mm), using a ball mill, at room temperature for 72 hours. The resulting slurry was filtered, washed repeatedly with methanol and dried under reduced pressure to obtain 0.97 g of III type crystals of dichlorotin phthalocyanine. FIG. 11 shows the powder X-ray diffraction pattern of the thus obtained III type crystals of dichlorotin phthalocyanine. FIG. 22 shows the results of thermal weight analysis of the crystals. About 11% weight reduction of the crystals was observed at about 130° C. (The amount of the sample tested was 9.39 mg.)

SYNTHESIS EXAMPLE 3

Figure 12:
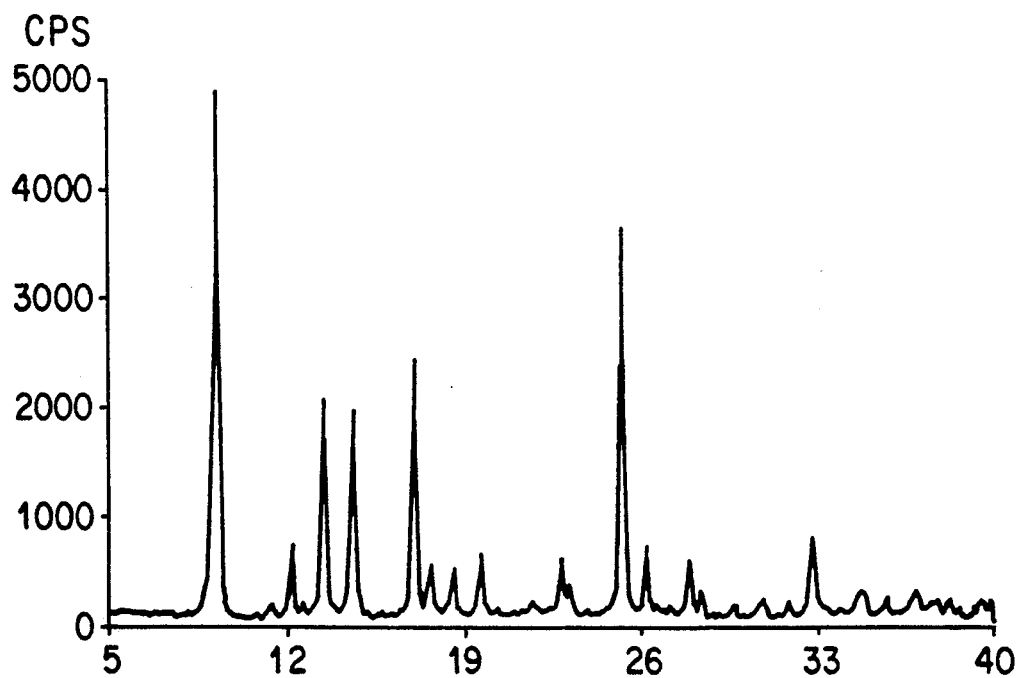
FIG. 12 shows the powder X-ray diffraction pattern of the dichlorotin phthalocyanine crystals obtained in Synthesis Example 3.
Figure 23:
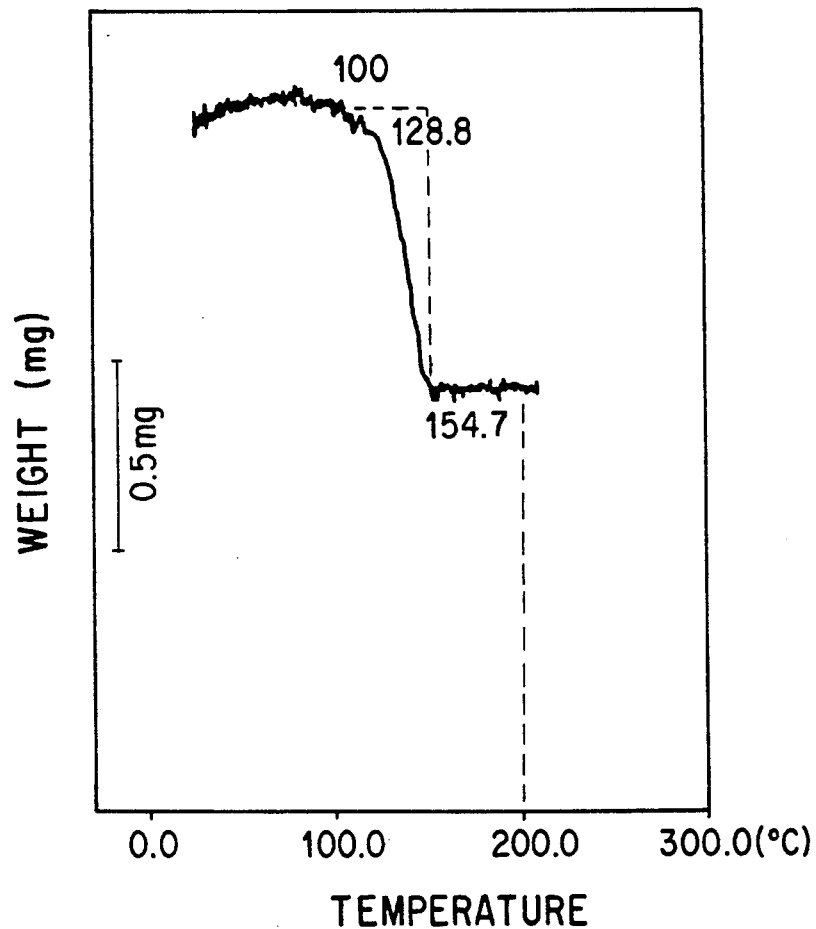
FIG. 23 shows the thermal weight analysis of the dichlorotin phthalocyanine crystals obtained in Synthesis Example 3.

The same process as in Synthesis Example 2 was repeated except that tetrahydrofuran (hereinafter referred to as THF) was used as the solvent for grinding, and 0.93 g of IV type crystals of dichlorotin phthalocyanine were obtained. FIG. 12 shows the powder X-ray diffraction pattern of the thus obtained IV type crystals of dichlorotin phthalocyanine. FIG. 23 shows the results of thermal weight analysis of the crystals. About 7% weight reduction of the crystals was observed at about 150° C. (The amount of the sample tested was 9.79 mg.)

SYNTHESIS EXAMPLE 4

Figure 13:
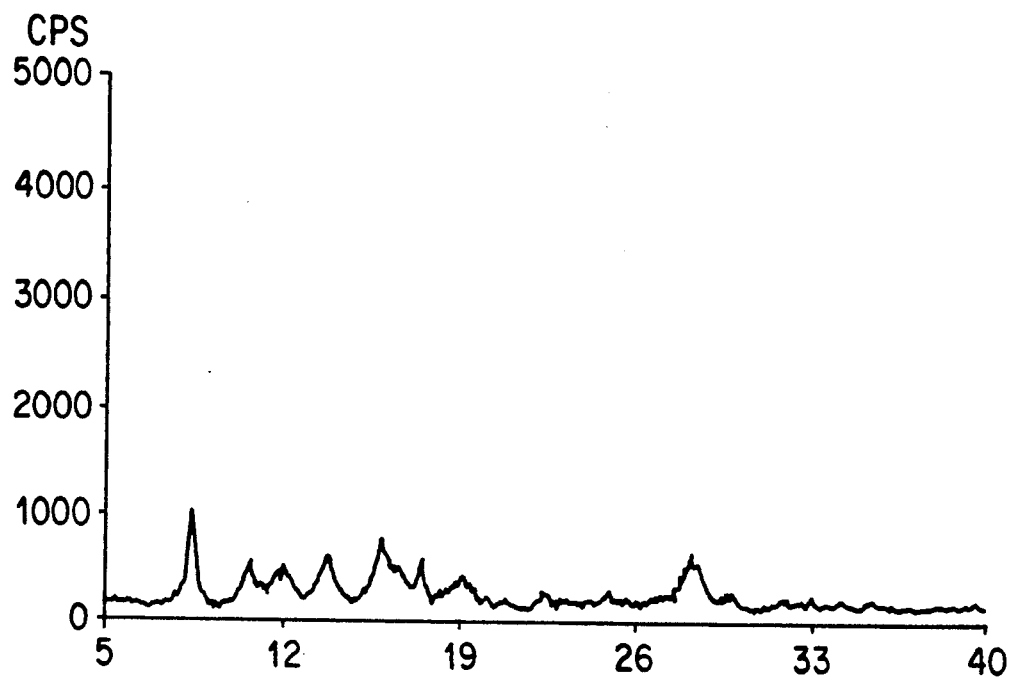
FIG. 13 shows the powder X-ray diffraction pattern of the dichlorotin phthalocyanine crystals obtained in Synthesis Example 4.

5 g of the dichlorotin phthalocyanine as obtained in Synthesis Example 1 was put in an agate pot (500 ml) along with 500 g of agate balls (diameter: 20 mm) and ground with a planet ball mill (P-5 Model, manufactured by Frisch Co.) at 400 rpm for one hour. FIG. 13 shows the powder X-ray diffraction pattern of the thus obtained dichlorotin phthalocyanine crystals.

SYNTHESIS EXAMPLE 0.5 g of the dichlorotin phthalocyanine crystals as obtained in Synthesis Example 4 were ground along with 15 ml of MCB and 30 g of glass beads at room temperature for 24 hours. Then, the glass beads were removed by filtration and the product was dried to obtain 0.45 g of III type crystals of dichlorotin phthalocyanine. The crystals had the same powder X-ray diffraction pattern as that of FIG. 11.

SYNTHESIS EXAMPLE 6

The same process as in Synthesis Example 5 was repeated except that MCB was replaced by THF, and 0.43 g of IV type crystals of dichlorotin phthalocyanine. The crystals had the same powder X-ray diffraction pattern as that of FIG. 12.

EXAMPLE 5

Figure 14:
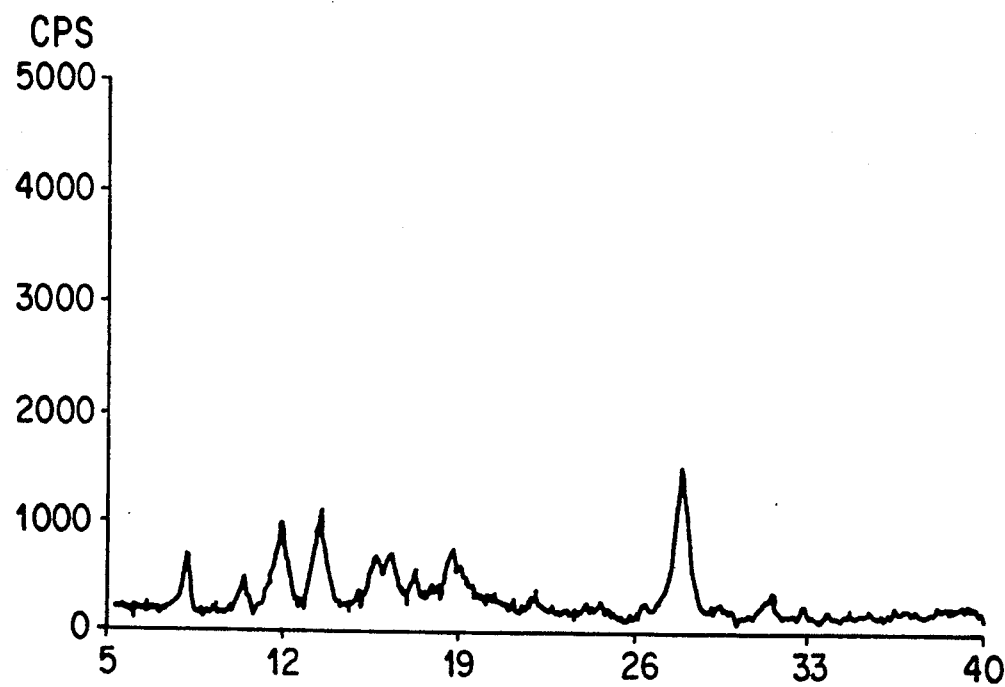
FIG. 14 shows the powder X-ray diffraction pattern of the dichlorotin phthalocyanine crystals obtained in Example 5.
Figure 24:
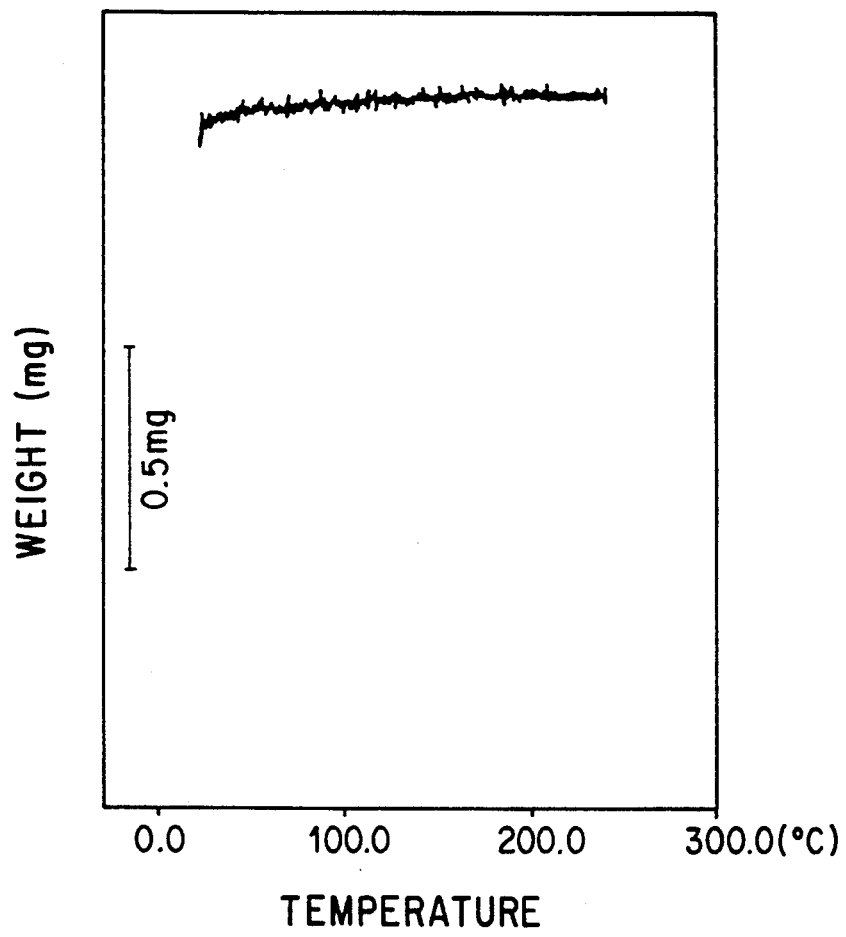
FIG. 24 shows the thermal weight analysis of the dichlorotin phthalocyanine crystals obtained in Example 5.

0.5 g of the III type crystals of dichlorotin phthalocyanine as obtained in Synthesis Example 2 was treated with 15 ml of n-butyl acetate in the same manner as in Synthesis Example 5, to obtain 0.40 g of I type crystals of dichlorotin phthalocyanine. FIG. 14 shows the powder X-ray diffraction pattern of the thus obtained I type crystals of dichlorotin phthalocyanine. FIG. 24 shows the results of thermal weight analysis of the crystals, in which almost no weight variation was noted between 0° C. and 200° C. (The amount of the sample tested was 9.78 mg.)

EXAMPLE 6

Figure 15:
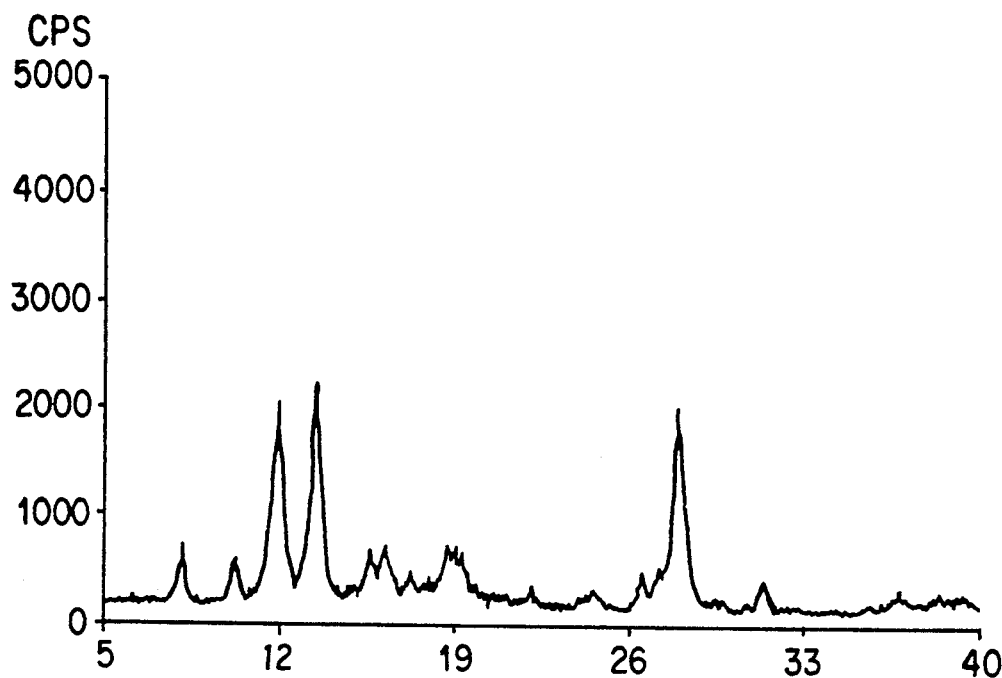
FIG. 15 shows the powder X-ray diffraction pattern of the dichlorotin phthalocyanine crystals obtained in Example 6.

The same process as in Example 5 was repeated except that 0.5 g of the IV type crystals of dichlorotin phthalocyanine as obtained in Synthesis Example 3 were used, to obtain 0.42 g of I type crystals of dichlorotin phthalocyanine of the present invention. FIG. 15 shows the powder X-ray diffraction pattern of the thus obtained I type crystals of dichlorotin phthalocyanine.

COMPARATIVE EXAMPLE 3

Figure 16:
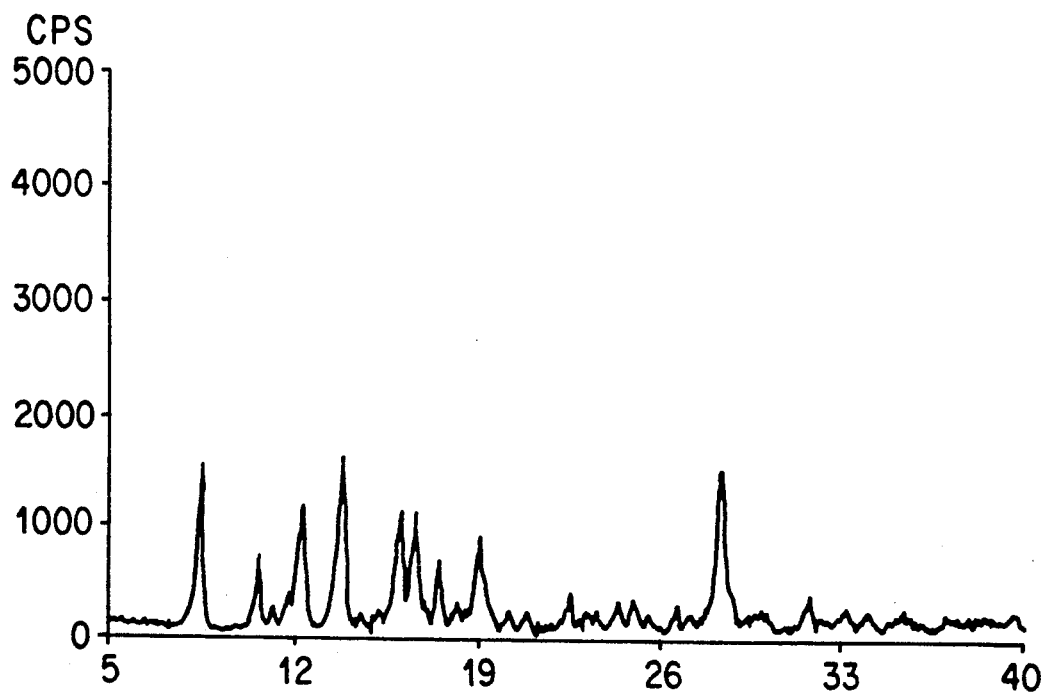
FIG. 16 shows the powder X-ray diffraction pattern of the dichlorotin phthalocyanine crystals obtained in Comparative Example 3.

0.5 g of the dichlorotin phthalocyanine crystals as obtained in Synthesis Example 4 were ground along with 15 ml of butyl acetate and 30 g of glass beads at room temperature for 24 hours. Then, the glass beads were removed by filtration, and the product was dried to obtain 0.45 g of I type crystals of dichlorotin phthalocyanine. FIG. 16 shows the powder X-ray diffraction pattern of the thus obtained I type crystals of dichlorotin phthalocyanine.

EXAMPLE 7

One part of the dichlorotin phthalocyanine crystals as obtained in Synthesis Example 2 were mixed with one part of polyvinyl butyral (S-Lec BM-S, trade name by Sekisui Chemical Co.) and 100 parts of n-butyl acetate, and the mixture was dispersed by treating in a paint shaker along with glass beads for one hour. The thus obtained coating composition was coated on an aluminium support by a dip-coating method and dried under heat at 100° C. for 5 minutes to form thereon a charge generating layer having a thickness of 0.2 μm.

Figure 17:
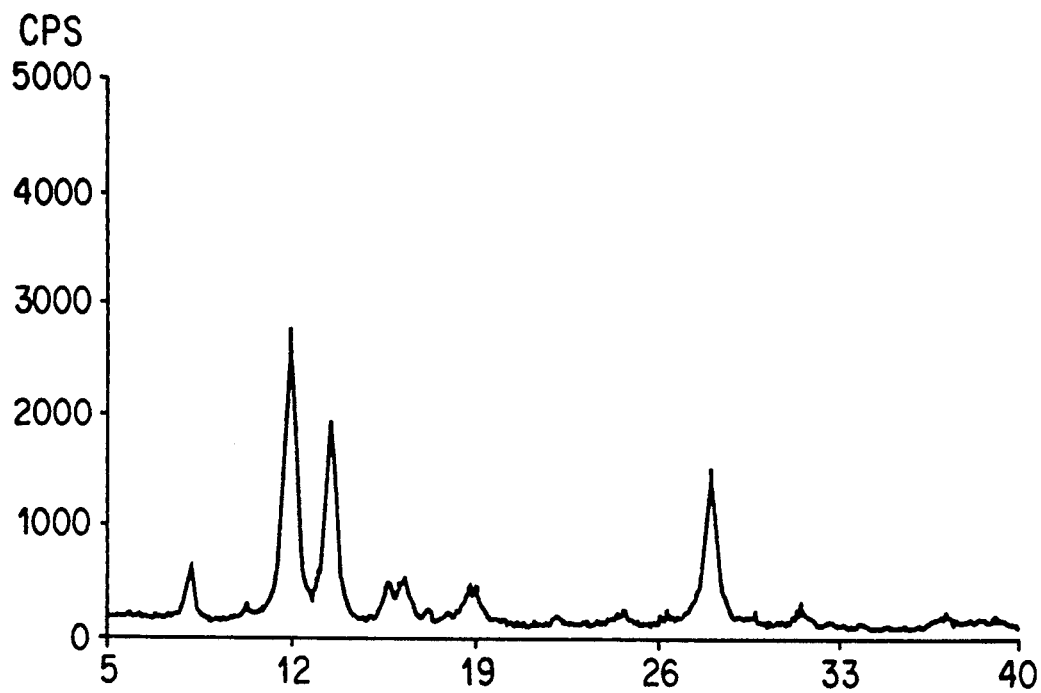
FIG. 17 shows the powder X-ray diffraction pattern of the dried coating composition used in Example 7.

Separately, the coating composition was dried and the powder X-ray diffraction thereof was measured. As a result, the crystals obtained were found to be I type crystals of dichlorotin phthalocyanine of the present invention as shown in FIG. 17.

2 parts of a compound having the following structural formula:

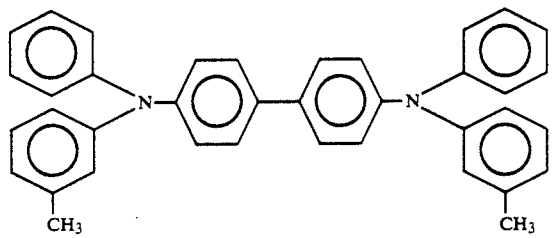

and 3 parts of poly(4,4-cyclohexylidene-diphenylene carbonate) having the following structural formula:

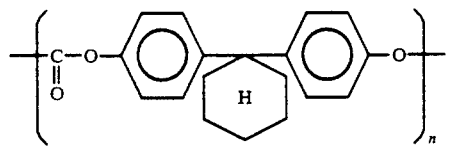

were dissolved in 20 parts of monochlorobenzene, and the resulting coating composition was coated over the charge generating layer as formed on the aluminium support by a dip-coating method, and dried at 120° C. for one hour to form a charge transporting layer thereon having a thickness of 20 μm.

The electrophotographic photoreceptor thus prepared was subjected to corona discharging of −6 KV so as to be charged under a room temperature and normal humidity condition (20° C., 50% RH), using an electrostatic duplicating paper test device (EPA-8100 Model, manufactured by Kawaguchi Denki Co.). Then an 800-nm monochromatic light as derived from a tungsten lamp with a monochrometer was irradiated to the photoreceptor, the irradiated intensity being adjusted to be 1 μW/cm² at the surface of the photoreceptor.

The amount of exposure $E_{\frac{1}{2}}$ (erg/cm²) until the surface potential became a half ($\frac{1}{2}$) of the initial potential $V_0$ (volt) was measured. Next, a tungsten light of 10 luxes was irradiated to the surface of the photoreceptor for one second, and the residual potential $V_R$ was measured. Further, the above charging and exposure cycle was repeated 1,000 times whereupon $V_0$, $E_{\frac{1}{2}}$ and $V_R$ were measured. The results obtained are shown in Table 2 below.

EXAMPLE 8

Figure 18:
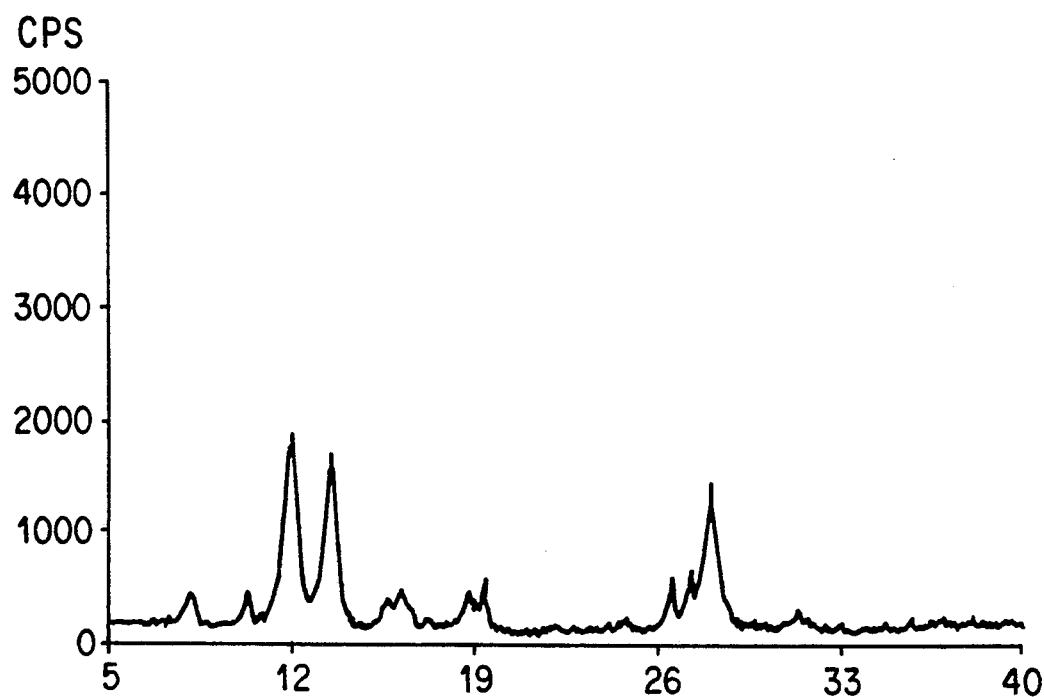
FIG. 18 shows the powder X-ray diffraction pattern of the dried coating composition used in Example 8.

A photoreceptor was prepared in the same manner as in Example 7, except that the dichlorotin phthalocyanine as prepared in Synthesis Example 3 was used, and the photoreceptor was evaluated in the same manner as in Example 7. The results obtained are shown in Table 2 below. Separately, the coating composition for the charge generating layer was dried and the powder X-ray diffraction thereof was measured. As a result, the crystals were found to be I type crystals of dichlorotin phthalocyanine of the present invention as shown in FIG. 18.

COMPARATIVE EXAMPLE 4

Figure 19:
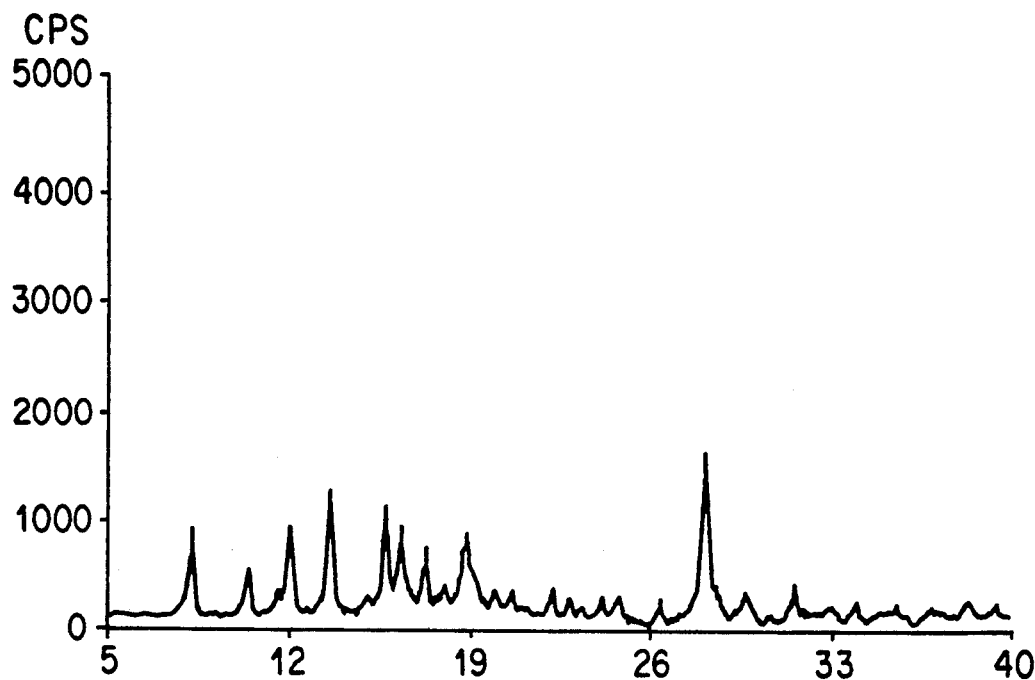
FIG. 19 shows the powder X-ray diffraction pattern of the dried coating composition used in Comparative Example 4.

A photoreceptor was prepared in the same manner as in Example 8, except that the I type crystals of dichlorotin phthalocyanine as prepared in Comparative Example 3 were used, and the photoreceptor was evaluated in the same manner as above. The results obtained are shown in Table 2 below. Separately, the coating composition for the charge generating layer was dried and the powder X-ray diffraction thereof was measured. As a result, the crystals were found to be still the original I type crystals as shown in FIG. 19.

COMPARATIVE EXAMPLES 5 TO 7

Photoreceptors were prepared in the same manner as in Example 8, except that n-butanol was used as the solvent for the coating composition of the charge generating layer in place of n-butyl acetate and that the dichlorotin phthalocyanine crystals as indicated in Table 2 were used. These photoreceptors were evaluated in the same manner as above. Separately, each of the coating compositions for the charge generating layers was dried and the powder X-ray diffraction thereof was measured. The results obtained are shown in Table 2.

TABLE 2

Figure 20:
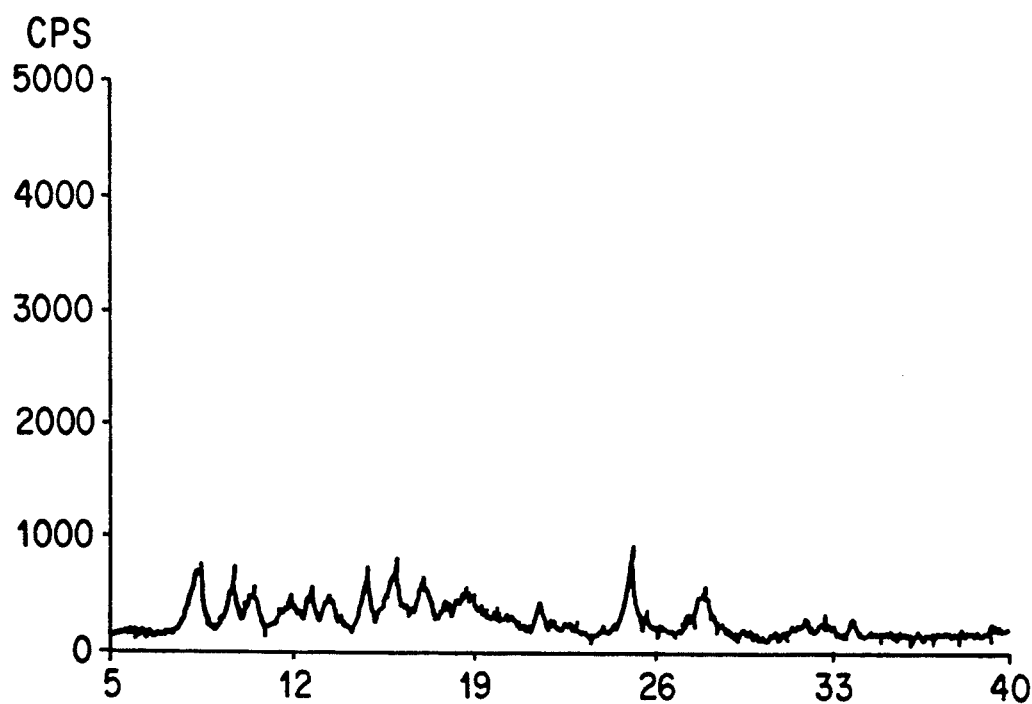
FIG. 20 shows the powder X-ray diffraction pattern of the dried coating composition used in Comparative Example 5.
Figure 21:
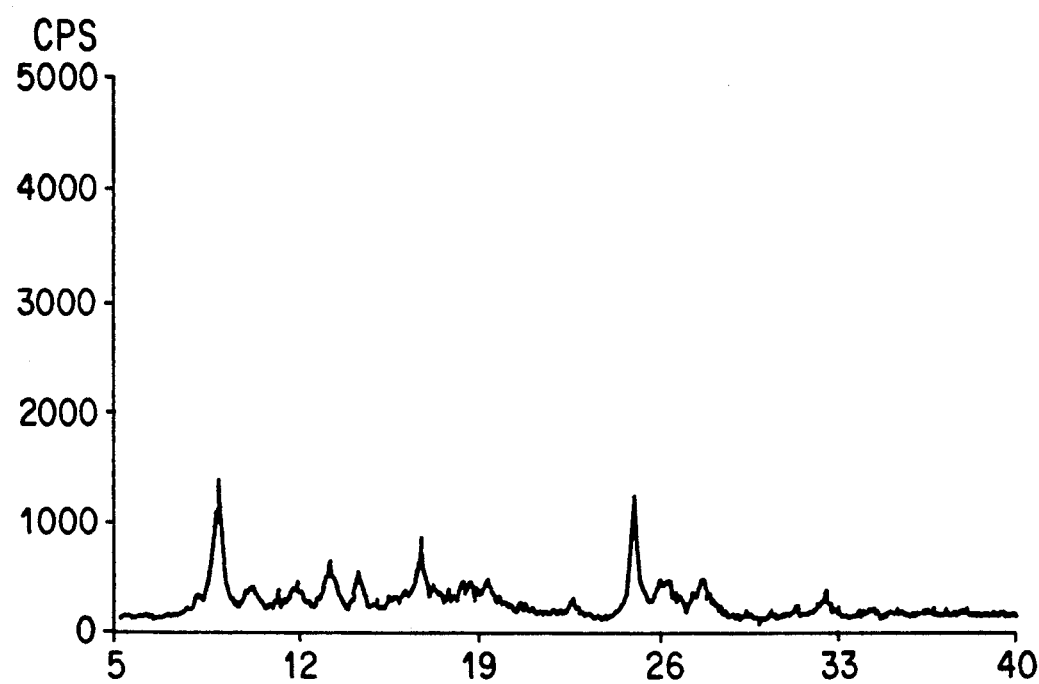
FIG. 21 shows the powder X-ray diffraction pattern of the dried coating composition used in Comparative Example 6.

| | | Characteristics of Photoreceptors | | | | | | |
|---|---|---|---|---|---|---|---|---|
| | Dichlorotin phthalocyanine | Initial Characteristics | | | Characteristics after 1,000 repetitions of charging-exposure cycle | | | X-ray diffraction pattern of dried coating composition for charge generating layer |
| Example | | $V_0$ (V) | $E_{\frac{1}{2}}$ (erg/cm²) | $V_R$ (V) | $V_0$ (V) | $E_{\frac{1}{2}}$ (erg/cm²) | $V_R$ (V) | |
| Example 7 | Synthesis Example 2 | −810 | 2.2 | 4 | −800 | 2.3 | 5 | FIG. 17 |
| Example 8 | Synthesis Example 3 | −820 | 2.3 | 4 | −800 | 2.5 | 5 | FIG. 18 |
| Comparative Example 4 | Comparative Example 3 | −800 | 3.2 | 4 | −790 | 3.3 | 6 | FIG. 19 |
| Comparative Example 5 | Synthesis Example 5 | −850 | 2.8 | 5 | −830 | 2.9 | 7 | FIG. 20 |
| Comparative Example 6 | Synthesis Example 6 | −800 | 3.6 | 7 | −780 | 3.5 | 9 | FIG. 21 |
| Comparative Example 7 | Comparative Example 3 | −790 | 3.5 | 7 | −780 | 3.5 | 10 | FIG. 19 |

As has been explained in detail in the above, the dichlorotin phthalocyanine crystals of the present invention have novel crystal forms and the wavelength range of the light to which they are sensitive is extended to a long wavelength range. Therefore, they are extremely useful as photoconductive materials for electrophotographic photoreceptors such as printers of using semiconductor lasers.

In accordance with the present invention, novel crystals of dichlorotin phthalocyanine which have the strongest diffraction peak at 28.2° in the range of from 25° to 30° of the Bragg angle (2θ±0.2) and which are useful as a photoconductive material can be prepared by simple treatment.

The electrophotographic photoreceptors of the present invention having the above-mentioned dichlorotin phthalocyanine crystals of the present invention or dichlorotin phthalocyanine crystals as prepared by the method of the present invention have high sensitivity and are useful as high-durability photoreceptors, since the residual charge is low, the charging property is high, and the fluctuation of the characteristics due to repeated use is small.

While the invention has been described in detail and with reference to specific embodiments thereof, it will be apparent to one skilled in the art that various changes and modifications can be made therein without departing from the spirit and scope thereof.

What is claimed is:

1. Dichlorotin phthalocyanine crystals having distinct diffraction peaks at 8.7°, 9.9°, 10.9°, 13.1°, 15.6°, 16.3°, 17.4°, 21.9° and 25.5° of the Bragg angle (2θ±0.2) to a CuKα characteristic X-ray.

2. Dichlorotin phthalocyanine crystals having distinct diffraction peaks at 9.2°, 12.2°, 13.4°, 14.6°, 17.0° and 25.3° of the Bragg angle (2θ±0.2) to a CuKα characteristic X-ray.

3. An electrophotographic photoreceptor comprising an electroconductive support having thereon a light-sensitive layer containing dichlorotin phthalocyanine crystals having distinct diffraction peaks at 8.7°, 9.9°, 10.9°, 13.1°, 15.2°, 16.3°, 17.4°, 21.9° and 25.5° of the Bragg angle (2θ±0.2) to a CuKα characteristic X-ray.

4. An electrophotographic photoreceptor comprising an electroconductive support having thereon a light-sensitive layer containing dichlorotin phthalocyanine crystals having distinct diffraction peaks at 9.2°, 12.2°, 13.4°, 14.6°, 17.0° and 25.3° of the Bragg angle (2θ±0.2) to a CuKα characteristic X-ray.

5. A method of preparing dichlorotin phthalocyanine crystals having the strongest diffraction peak at 28.2° in the range of from 25° to 30° of the Bragg angle (2θ±0.2) in an X-ray diffraction spectrum, said method comprising treating (a) dichlorotin phthalocyanine crystals having distinct diffraction peaks at 8.7°, 9.9°, 10.9°, 13.1°, 15.2°, 16.3°, 17.4°, 21.9° and 25.5° of the Bragg angle (2θ±0.2) in an X-ray diffraction spectrum, or (b) dichlorotin phthalocyanine crystals having distinct diffraction peaks at 9.2°, 12.2°, 13.4°, 14.6°, 17.0° and 25.3° of the Bragg angle (2θ±0.2) in an X-ray diffraction spectrum in an organic solvent so as to transfer said crystals into dichlorotin phthalocyanine crystals having the strongest diffraction peak at 28.2° in the range of from 25° to 30° of the Bragg angle (2θ±0.2) in an X-ray diffraction spectrum.

6. An method of preparing dichlorotin phthalocyanine crystals having the strongest diffraction peak at 28.2° in the range of from 25° to 30° of the Bragg angle (2θ±0.2) in an X-ray diffraction spectrum as claimed in claim 5, wherein said organic solvent contains a binder resin.

7. An method of preparing dichlorotin phthalocyanine crystals having the strongest diffraction peak at 28.2° in the range of from 25° to 30° of the Bragg angle (2θ±0.2) in an X-ray diffraction spectrum as claimed in claim 5, wherein said organic solvent is selected from acetates.

8. An electrophotographic photoreceptor comprising an electroconductive support having thereon a light-sensitive layer containing dichlorotin phthalocyanine crystals having the strongest diffraction peak at 28.2° in the range of from 25° to 30° of the Bragg angle (2θ±0.2) in an X-ray diffraction spectrum, said dichloration phthalocyanie crystals prepared by a method comprising treating (a) dichlorotin phthalocyanine crystals having distinct diffraction peaks at 8.7°, 9.9°, 10.9°, 13.1°, 15.2°, 16.3°, 17.4°, 21.9° and 25.5° of the Bragg angle (2θ±0.2) in an X-ray diffraction spectrum, or (b) dichlorotin phthalocyanine crystals having distinct diffraction peaks at 9.2°, 12.2°, 13.4°, 14.6°, 17.0° and 25.3° of the Bragg angle (2θ±0.2) in an X-ray diffraction spectrum in an organic solvent so as to transfer said crystals into dichlorotin phthalocyanine crystals having the strongest diffraction peak at 28.2° in the range of from 25° to 30° of the Bragg angle (2θ±0.2) in an X-ray diffraction spectrum.

9. Dichlorotin phthalocyanine crystals having distinct diffraction peaks at degrees of the Bragg angle (2θ±0.2) to a CuKα characteristic X-ray prepared by treating dichlorotin phthalocyanine with an organic solvent.

10. Dichlorotin phthalocyanine crystals of claim 9, having distinct diffraction peaks at 8.7°, 9.9°, 10.9°, 13.1°, 15.6°, 16.3°, 17.4°, 21.9° and 25.5° of the Bragg angle (2θ±0.2) to a CuKα characteristic X-ray.

11. Dichlorotin phthalocyanine crystals of claim 9, having distinct diffraction peaks at 9.2°, 12.2°, 13.4°, 14.6°, 17.0° and 25.3° of the Bragg angle (2θ±0.2) to a CuKα characteristic X-ray.

12. Dichlorotin phthalocyanine crystals of claim 9, wherein said organic solvent is selected from the group consisting of toluene, xylene, and chlorobenzene.

13. Dichlorotin phthalocyanine crystals of claim 9, wherein said organic solvent is selected from the group consisting of tetrahydrofuran and 1,4-dioxane.

14. Dichlorotin phthalocyanine crystals of claim 9 having the strongest diffraction peak at 28.2° in the range of from 25° to 30° of the Bragg angle (2θ±0.2) in the X-ray diffraction spectrum.

15. Dichlorotin phthalocyanine crystals of claim 14, prepared by treating (a) dichlorotin phthalocyanine crystals having distinct diffraction peaks at 8.7°, 9.9°, 10.9°, 13.1°, 15.6°, 16.3°, 17.4°, 21.9° and 25.5° of the Bragg angle (2θ±0.2) in an X-ray diffraction spectrum, or (b) dichloro phthalocyanine crystals having distinct diffraction peaks at 9.2°, 12.2°, 13.4°, 14.6°, 17.0° and 25.3° of the Bragg angle (2θ±0.2) in an X-ray diffraction spectrum, with an organic solvent.

16. Dichlorotin phthalocyanine crystals of claim 15, wherein said organic solvent is selected from the group consisting of ketones, halogenated hydrocarbons, acetates and dimethylformamide.

17. Dichlorotin phthalocyanine crystals of claim 16, wherein said organic solvent is selected from the group acetone, methyl ethyl ketone, methylene chloride, chloroform, ethyl acetate, butyl acetate and dimethylformamide.

* * * * *